United States Patent
Paparizos et al.

(10) Patent No.: US 9,092,517 B2
(45) Date of Patent: Jul. 28, 2015

(54) GENERATING SYNONYMS BASED ON QUERY LOG DATA

(75) Inventors: Stelios Paparizos, San Jose, CA (US); Tao Cheng, Urbana, IL (US); Hady W. Lauw, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 924 days.

(21) Appl. No.: 12/235,635

(22) Filed: Sep. 23, 2008

(65) Prior Publication Data

US 2010/0082657 A1   Apr. 1, 2010

(51) Int. Cl.
*G06F 17/30* (2006.01)

(52) U.S. Cl.
CPC ................. *G06F 17/30737* (2013.01)

(58) Field of Classification Search
CPC ................................... G06F 17/30737
USPC .......................... 707/706, 765, 766
See application file for complete search history.

(56) References Cited

U.S. PATENT DOCUMENTS

| | | | |
|---|---|---|---|
| 5,297,039 A | | 3/1994 | Kanaegami et al. |
| 5,418,948 A | | 5/1995 | Turtle |
| 5,469,355 A | | 11/1995 | Tsuzuki |
| 5,717,913 A | | 2/1998 | Driscoll |
| 5,805,911 A | * | 9/1998 | Miller ........................... 715/234 |
| 5,926,808 A | * | 7/1999 | Evans et al. ............................ 1/1 |
| 6,006,225 A | * | 12/1999 | Bowman et al. ....................... 1/1 |
| 6,012,055 A | * | 1/2000 | Campbell et al. ..................... 1/1 |
| 6,098,034 A | | 8/2000 | Razin et al. |
| 6,137,911 A | | 10/2000 | Zhilyaev |
| 6,269,368 B1 | | 7/2001 | Diamond |
| 6,363,377 B1 | | 3/2002 | Kravets et al. |
| 6,370,527 B1 | | 4/2002 | Singhal |

(Continued)

FOREIGN PATENT DOCUMENTS

| WO | 02/29627 A2 | 4/2002 |
|---|---|---|
| WO | 2006/123918 A1 | 11/2006 |

OTHER PUBLICATIONS

Jens Graupmann, "Concept-Based Search on Semi-Structured Data Exploiting Mined Semantic Relations," EDBT 2004 Workshops, LNCS 3268, Eds. W. Lindner et al., Springer-Verlag, Berlin Heidelberg, 2004, accessible at <<http://www.springerlink.com/content/p7fw8dk70v2x8w4a/fulltext.pdf>>, pp. 34-43.

(Continued)

*Primary Examiner* — Noosha Arjomandi
(74) *Attorney, Agent, or Firm* — Micah Goldsmith; Judy Yee; Micky Minhas

(57) ABSTRACT

An approach is described for generating synonyms to supplement at least one information item, such as, in one case, a set of related items. The approach can involve an expansion phase, a clean-up phase, and a reduction phase. In the expansion phase, the approach identifies, for each related item, a set of initial synonym candidates. In the clean-up phase, the approach removes noise from the set of initial synonym candidates (if such noise exists), to provide a set of filtered synonym candidate items. In the reduction phase, the approach ranks and applies a threshold (or thresholds) to the set of filtered synonym candidate items, to generate, for each information item, a set of selected synonyms. The approach uses query log data at various points in its operation. The selected synonyms can be used to improve the effectiveness of user searches.

20 Claims, 11 Drawing Sheets

(56) References Cited

U.S. PATENT DOCUMENTS

| | | | |
|---|---|---|---|
| 6,377,945 B1 | 4/2002 | Risvik | |
| 6,510,406 B1* | 1/2003 | Marchisio | 704/9 |
| 6,675,159 B1 | 1/2004 | Lin et al. | |
| 6,697,818 B2 | 2/2004 | Li et al. | |
| 6,804,677 B2 | 10/2004 | Shadmon et al. | |
| 7,080,068 B2 | 7/2006 | Leitermann | |
| 7,149,746 B2 | 12/2006 | Fagin et al. | |
| 7,254,774 B2 | 8/2007 | Cucerzan et al. | |
| 7,293,003 B2* | 11/2007 | Horton | 706/45 |
| 7,296,011 B2 | 11/2007 | Chaudhuri et al. | |
| 7,330,811 B2* | 2/2008 | Turcato et al. | 704/10 |
| 7,440,941 B1 | 10/2008 | Borkovsky et al. | |
| 7,483,829 B2* | 1/2009 | Murakami et al. | 704/10 |
| 7,526,425 B2 | 4/2009 | Marchisio et al. | |
| 7,552,112 B2 | 6/2009 | Jhala et al. | |
| 7,617,202 B2 | 11/2009 | Brill et al. | |
| 7,627,548 B2 | 12/2009 | Riley et al. | |
| 7,634,462 B2 | 12/2009 | Weyand et al. | |
| 7,636,714 B1 | 12/2009 | Lamping et al. | |
| 7,707,047 B2* | 4/2010 | Hasan et al. | 705/3 |
| 7,778,817 B1* | 8/2010 | Liu et al. | 704/9 |
| 7,860,853 B2 | 12/2010 | Ren et al. | |
| 7,877,343 B2 | 1/2011 | Cafarella | |
| 7,890,521 B1 | 2/2011 | Grushetskyy et al. | |
| 7,890,526 B1 | 2/2011 | Brewer et al. | |
| 7,958,489 B2 | 6/2011 | Meijer et al. | |
| 8,239,751 B1 | 8/2012 | Rochelle et al. | |
| 8,332,333 B2 | 12/2012 | Agarwal | |
| 8,417,713 B1* | 4/2013 | Blair-Goldensohn et al. | 707/751 |
| 8,429,099 B1 | 4/2013 | Perkowitz et al. | |
| 8,577,907 B1* | 11/2013 | Singhal et al. | 707/759 |
| 2001/0042080 A1 | 11/2001 | Ross | |
| 2002/0103793 A1 | 8/2002 | Koller et al. | |
| 2002/0169755 A1 | 11/2002 | Framroze et al. | |
| 2003/0004716 A1* | 1/2003 | Haigh et al. | 704/238 |
| 2003/0033288 A1 | 2/2003 | Shanahan et al. | |
| 2003/0120651 A1 | 6/2003 | Bernstein et al. | |
| 2003/0195877 A1* | 10/2003 | Ford et al. | 707/3 |
| 2004/0254920 A1 | 12/2004 | Brill et al. | |
| 2005/0060312 A1 | 3/2005 | Curtiss et al. | |
| 2005/0060337 A1 | 3/2005 | Chou et al. | |
| 2005/0060643 A1 | 3/2005 | Glass et al. | |
| 2005/0080613 A1 | 4/2005 | Colledge et al. | |
| 2005/0086592 A1 | 4/2005 | Polanyi et al. | |
| 2005/0114322 A1* | 5/2005 | Melman | 707/3 |
| 2005/0149494 A1 | 7/2005 | Lindh et al. | |
| 2005/0216443 A1 | 9/2005 | Morton et al. | |
| 2005/0216444 A1 | 9/2005 | Ritter et al. | |
| 2006/0031207 A1 | 2/2006 | Bjarnestam et al. | |
| 2006/0069589 A1 | 3/2006 | Nigam et al. | |
| 2006/0089927 A1 | 4/2006 | Bandyopadhyay et al. | |
| 2006/0136405 A1 | 6/2006 | Ducatel et al. | |
| 2006/0195421 A1* | 8/2006 | Kilroy | 707/3 |
| 2006/0206306 A1 | 9/2006 | Cao et al. | |
| 2006/0218136 A1 | 9/2006 | Surakka et al. | |
| 2006/0253427 A1 | 11/2006 | Wu et al. | |
| 2007/0011154 A1 | 1/2007 | Musgrove et al. | |
| 2007/0011183 A1 | 1/2007 | Langseth et al. | |
| 2007/0038663 A1 | 2/2007 | Colando | |
| 2007/0043723 A1 | 2/2007 | Bitan et al. | |
| 2007/0073745 A1 | 3/2007 | Scott et al. | |
| 2007/0094285 A1 | 4/2007 | Agichtein et al. | |
| 2007/0100823 A1 | 5/2007 | Inmon | |
| 2007/0192085 A1 | 8/2007 | Roulland et al. | |
| 2007/0203929 A1* | 8/2007 | Bolivar | 707/101 |
| 2007/0233656 A1 | 10/2007 | Bunescu et al. | |
| 2007/0239742 A1 | 10/2007 | Saha et al. | |
| 2008/0016040 A1 | 1/2008 | Jones et al. | |
| 2008/0021898 A1 | 1/2008 | Hoglund | |
| 2008/0077570 A1 | 3/2008 | Tang et al. | |
| 2008/0087725 A1* | 4/2008 | Liu | 235/385 |
| 2008/0091660 A1* | 4/2008 | Jang et al. | 707/3 |
| 2008/0097941 A1 | 4/2008 | Agarwal | |
| 2008/0109416 A1* | 5/2008 | Williams | 707/3 |
| 2008/0147618 A1 | 6/2008 | Bauche | |
| 2008/0154873 A1 | 6/2008 | Redlich et al. | |
| 2008/0195601 A1 | 8/2008 | Ntoulas et al. | |
| 2008/0275837 A1 | 11/2008 | Lambov | |
| 2009/0044095 A1 | 2/2009 | Berger et al. | |
| 2009/0144609 A1 | 6/2009 | Liang et al. | |
| 2009/0222434 A1 | 9/2009 | Fothergill | |
| 2009/0282012 A1 | 11/2009 | Konig et al. | |
| 2009/0319500 A1 | 12/2009 | Agrawal et al. | |
| 2009/0327223 A1 | 12/2009 | Chakrabarti et al. | |
| 2010/0004925 A1 | 1/2010 | Ah-Pine et al. | |
| 2010/0082657 A1 | 4/2010 | Paparizos et al. | |
| 2010/0121702 A1 | 5/2010 | Steelberg et al. | |
| 2010/0250598 A1 | 9/2010 | Brauer et al. | |
| 2010/0293179 A1 | 11/2010 | Chaudhuri et al. | |
| 2010/0313258 A1 | 12/2010 | Chaudhuri et al. | |
| 2011/0029513 A1 | 2/2011 | Morris | |
| 2011/0071965 A1 | 3/2011 | Long et al. | |
| 2011/0106807 A1 | 5/2011 | Srihari et al. | |
| 2011/0125776 A1 | 5/2011 | Roshen et al. | |
| 2011/0213796 A1 | 9/2011 | Kiyota et al. | |
| 2011/0282856 A1 | 11/2011 | Ganti et al. | |
| 2011/0302179 A1 | 12/2011 | Agrawal | |
| 2011/0307485 A1 | 12/2011 | Udupa et al. | |
| 2012/0011115 A1 | 1/2012 | Madhavan et al. | |
| 2012/0117078 A1 | 5/2012 | Morton et al. | |
| 2012/0150838 A1 | 6/2012 | Yin et al. | |
| 2012/0191642 A1 | 7/2012 | George | |
| 2012/0259890 A1 | 10/2012 | Denesuk et al. | |
| 2013/0166573 A1 | 6/2013 | Vaitheeswaran et al. | |
| 2013/0232129 A1 | 9/2013 | Cheng et al. | |

OTHER PUBLICATIONS

Cohen, et al., "XSEarch: A Semantic Search Engine for XML," Proceedings of the 29th VLDB Conference, Berlin, Germany, 2003, accessible at <<http://www.vldb.org/conf/2003/papers/S03P02.pdf>>, 12 pages.

Chklovski, et al., "Verbocean: Mining the Web for Fine-Grained Semantic Verb Relations," Proceedings of EMNLP 2004, 2004, accessible at <<http://acl.ldc.upenn.edu/acl2004/emnlp/pdf/Chklovski.pdf>>, 8 pages.

Chang, et al., "Structured Databases on the Web: Observations and Implications," ACM SIGMOD Record archive, vol. 33, Issue 3, 2004, accessible at <<http://eagle.cs.uiuc.edu/pubs/2004/dwsurvey-sigmodrecord-chlpz-aug04.pdf>>, 10 pages.

Craswell, et al., "Random Walks on the Click Graph," Proceedings of the 30th Annual International ACM SIGIR Conference on Research and Development in Information Retrieval, 2007, accessible at <<http://research.microsoft.com/users/nickcr/pubs/craswell_sigir07.pdf>>, 8 pages.

Fuxman, et al., "Using the Wisdom of the Crowds for Keyword Generation," Proceeding of the 17th International Conference on World Wide Web, 2008, accessible at <<http://delivery.acm.org/10.1145/1370000/1367506/p61fuxman.pdf?key1=1367506&key2=7612479121&coll=&dl=ACM&CFID=592564&CFTOKEN=87519440>>, pp. 61-70.

Malekian, et al., "Optimizing Query Rewrites for Keyword-Based Advertising," ACM Conference on Electronic Commerce (EC), Chicago, Illinois, Jul. 8-12, 2008, accessible at <<http://delivery.acm.org/10.1145/1390000/1386793/p10-malekian.pdf?key1=1386793&key2=8852479121&coll=ACM&dl=ACM&CFID=593354&CFTOKEN=82835948>>, pp. 10-19.

Miller, George A., "Wordnet: A Lexical Database for English," Communications of the ACM, vol. 38, No. 11, Nov. 1995, accessible at <<http://delivery.acm.org/10.1145/220000/219748/p39-miller.pdf?key1=219748&key2=0502389121&coll=GUIDE&dl=GUIDE&CFID=604516&CFTOKEN=66566361>>, pp. 39-41.

Strube, et al., "Wikirelate! Computing Semantic Relatedness Using Wikipedia," AAAI Press, 2006, accessible at <<http://www.dit.unitn.it/~p2p/RelatedWork/Matching/aaai06.pdf>>, 6 pages.

Turney, Peter D., "Mining the Web for Synonyms: PMI-IR versus LSA on TOEFL," Lecture Notes in Computer Science, 2167, 2001, accessible at <<http://cogprints.org/1796/1/ECML2001.ps>>, 12 pages.

(56) References Cited

OTHER PUBLICATIONS

Wen, et al., "Clustering User Queries of a Search Engine," Proceedings of the 10th International Conference on World Wide Web, 2001, accessible <<http://research.microsoft.com/users/jrwen/jrwen_files/publications/QC-WWW10.pdf>>, pp. 162-168.
Zhai, et al., "A Study of Smoothing Methods for Language Models Applied to Ad Hoc Information Retrieval," Proceedings of the 24th Annual International ACM SIGIR Conference on Research and Development in Information Retrieval, 2001, accessible at <<http://ciir.cs.umass.edu/irchallenges/smooth.pdf>>, 9 pages.
Cheng, et al., "Entity Synonyms for Structured Web Search," retrieved at <<http://ieeexplore.ieee.org/stamp/stamp.jsp?tp=&arnumber=5963679>>, Proceedings of the IEEE Transactions on Knowledge and Data Engineering, Jul. 29, 2011, 15 pages.
Chen, et al., "A Query Substitution-Search Result Refinement Approach for Long Query Web Searches," retrieved at <<http://ieeexplore.ieee.org/stamp/stamp.jsp?tp=&arnumber=5286069>>, Proceedings of the IEEE/WIC/ACM International Joint Conferences on Web Intelligence and Intelligent Agent Technologies, Sep. 15, 2009, pp. 245-251.
Jain, et al., "Domain-Independent Entity Extraction from Web Search Query Logs," retrieved at <<http://www.marcopennacchiotti.com/pro/publications/WWW_2011_2.pdf>>, Proceedings of the 20th International Conference Companion on World Wide Web, Mar. 28, 2011, pp. 63-64.
Chaudhuri, et al., "Robust and Efficient Fuzzy Match for Online Data Cleaning," retrieved at <<http://research.microsoft.com/pubs/75996/bm_sigmod03.pdf>>, SIGMOND 2003, 2003, pp. 313-324.
Minjuan, et al., "Pseudo-Relevance Feedback Driven for XML Query Expansion," retrieved at <<http://www.aicit.org/jcit/ppl/JCIT0509_15.pdf>>, Journal of Convergence Information Technology, vol. 5, No. 9, Nov. 2010, pp. 146-156.
Pasca, Marius, "Weakly-Supervised Discovery of Named Entities Using Web Search Queries," retrieved at <<http://www.acm.org>>, Proceedings of the Sixteenth ACM Conference on Conference on Information and Knowledge Management, Nov. 2007, pp. 683-690.
Kim, et al., "A comparison of collocation-based similarity measures in query expansion," Information Processing and Management, No. 35, 1999, pp. 19-30.
Schenkel, et al., "Efficient Top-k Querying over Social-Tagging Networks," retrieved at <<http://acm.org>>, Proceedings of the 31st Annual International ACM SIGIR Conference on Research and Development in Information Retrieval, Jul. 2008, 8 pages.
Tsoukalas, et al., "PLEDS: A Personalized Entity Detection System Based on Web Log Mining Techniques," retrieved at <<http://www2.fas.sfu.ca/pub/cs/techreports/2008/CMPT2008-06.pdf>>, WAIM, Proceedings of the Ninth International Conference on Web-Age Information Management, Jul. 2008, pp. 1-23.
Peters, et al., "Folksonomy and Information Retrieval," retrieved at <<http://wwwalt.phil-fak.uni-duesseldorf.de/infowiss/admin/public_dateien/files/1/1194344432asist_am07.pdf>>, Proceedings of the 70th ASIS&T Annual Meeting, vol. 44, 2007, 33 pages.
Chirita, et al., "PTAG: Large Scale Automatic Generation of Personalized Annotation TAGs for the Web," retrieved at <<http://acm.org >>, Proceedings of the 16th International Conference on World Wide Web, May 2007, pp. 845-854.
Chaudhuri, et al., "Exploiting Web Search to Generate Synonyms for Entities," retrieved at <<http://www2009.org/proceedings/pdf/p151.pdf>>, Proceedings of the 18th International Conference on World Wide Web, Apr. 2009, pp. 151-160.
Chaudhuri, et al., "Mining Document Collections to Facilitate Accurate Approximate Entity Matching," retrieved at <<http://www.vldb.org/pvldb/2/vldb09-315.pdf>>, Proceedings of the VLDB Endowment, vol. 2, No. 1, Aug. 2009, 12 pages.
Agrawal, et al., "Exploiting web search engines to search structured databases," retrieved at <<http://acm.org>>, Proceedings of the 18th International Conference on World Wide Web, Apr. 2009, pp. 501-510.

Agrawal, et al., "Scalable Ad-hoc Entity Extraction from Text Collections," retrieved at <<http://www.acm.org>>, Proceedings of the VLDB Endowment VLDB Endowment, vol. 1, Issue 1, Aug. 2008, pp. 945-957.
Baroni, et al., "Using cooccurrence statistics and the web to discover synonyms in a technical language," retrieved at <<http://clic.cimec.unitn.it/marco/publications/lrec2004/syn_lrec_2004.pdf>>, Proceedings of the LREC 2004, 2004, 4 pages.
Dong, et al., "Reference Reconciliation in Complex Information Spaces," retrieved at <<http://acm.org>>, Proceedings of the 2005 ACM SIGMOD International Conference on Management of Data, 2005, pp. 85-96.
"Distributional hypothesis," retrieved at <<http://en.wikipedia.org/wiki/Distributional_hypothesis>>, retrieved on Mar. 1, 2011, Wikipedia online encyclopedia excerpt, 2 pages.
Isard, et al., "Dryad: Distributed Data-Parallel Programs from Sequential Building Blocks," retrieved at <<http://research.microsoft.com/pubs/63785/eurosys07.pdf>>, EuroSys 2007, 2007, 14 pages.
Jones, et al., "Generating Query Substitutions," retrieved at <<http://acm.org>>, Proceedings of the 15th International Conference on World Wide Web, 2006, pp. 387-396.
Mei, et al., "Query suggestion using hitting time," retrieved at <<http://ACM.org>>, Proceedings of the 17th ACM Conference on Information and Knowledge Management, Oct. 2008, pp. 469-477.
Navarro, Gonzalo, "A Guided Tour to Approximate String Matching," retrieved at <<http://ACM.org>>, ACM Computing Surveys, vol. 33, Issue 1, Mar. 2001, pp. 31-88.
Guo, et al., "Named Entity Recognition in Query," retrieved at <<http://acm.org>>, Proceedings of the 32nd International ACM SIGIR Conference on Research and Development in Information Retrieval, Jul. 2009, pp. 267-274.
Pantel, et al., "Web-Scale Distributional Similarity and Entity Set Expansion," retrieved at <<http://www.aclweb.org/anthology/D/D09/D09-1098.pdf>>, Proceedings of the 2009 Conference on Empirical Methods in Natural Language Processing, Aug. 2009, pp. 938-947.
Sarkas, et al., "Structured Annotations of Web Queries," retrieved at <<http://acm.org>>, Proceedings of the 2010 International Conference on Management of Data, Jun. 2010, pp. 771-782.
Cheng, et al., "Fuzzy Matching of Web Queries to Structured Data," retrieved at <<http://ieeexplore.ieee.org>>, 2010 IEEE 26th International Conference on Data Engineering (ICDE), Mar. 2010, pp. 713-716.
Cheng et al., U.S. Appl. No. 61/606,481, filed Mar. 5, 2012, 61 pages.
Baeza-Yates, et al., "Extracting Semantic Relations from Query Logs," retrieved at <<http://acm.org>>, Proceedings of the 13th ACM SIGKDD International Conference on Knowledge Discovery and Data Mining, Aug. 12-15, 2007, pp. 76-85.
U.S. Appl. No. 12/779,964, 2 pages.
"Foundations of Statistical Natural Language Processing," retrieved at <<http://nlp.stanford.edu/fsnlp/>>, retrieved on Jul. 4, 2012, companion website to the book: Foundations of Statistical Natural Language Processing, Manning, et al., MIT Press, Jun. 18, 1999, 2 pages.
Agrawal, "Mining Association Rules Between Sets of Items in Large Databases," retrieved at <<http://rakesh.agrawal-family.com/papers/sigmod93assoc.pdf>>, Proceedings of the 1993 ACM SIGMOD International Conference on Management of Data, May 1993, 10 pages.
Aho, et al., "Efficient String Matching: An Aid to Bibliographic Search," retrieved at <<http://www.win.tue.nl/~watson/2R080/opdracht/p333-aho-corasick.pdf>>, Communications of the ACM CACM, vol. 18, Issue 6, Jun. 1975, pp. 333-340.
ARASU, et al., "Efficient Exact Set-Similarity Joins," retrieved at <<http://www.vldb.org/conf/2006/p918-arasu.pdf>>, Proceedings of the 32nd International Conference on Very Large Data Bases, Sep. 2006, pp. 918-929.
Argawal, et al., "Scalable Ad-hoc Entity Extraction from Text Collections," retrieved at <<http://www.cs.uwaterloo.ca/~ilyas/CS848F08/papers/agrawal2008.pdf>>, Proceedings of the VLDB Endowment VLDB Endowment, vol. Issue 1, Aug. 2008 pp. 945-957.
Bohn, Christian, "Extracting Named Entities and Synonyms from Wikipedia for use in News Search," retrieved at <<http://daim.idi.

(56) References Cited

OTHER PUBLICATIONS ntnu.no/masteroppgaver/IME/IDI/2008/4290/masteroppgave. pdf>>, Master of Science in Computer Science, Norwegian University of Science and Technology, Department of Computer and Information Science, Jun. 2008, 95 pages.
Chakrabarti, et al., "An Efficient Filter for Approximate Membership Checking," retrieved at <<http://acm.org>>, Proceedings of the 2008 ACM SIGMOD International Conference on Management of Data, Jun. 2008, pp. 805-817.
Chandel, et al., "Efficient Batch Top-k Search for Dictionary-based Entity Recognition," retrieved at <<http://www.it.iitb.ac.in/~sunita/papers/icde06b.pdf>>, Proceedings of the 22nd International Conference on Data Engineering, IIT Bombay, 10 pages.
Chaudhuri, et al., "A Primitive Operator for Similarity Joins in Data Cleaning," retrieved at <<http://ieeexplore.ieee.org/stamp.jsp?arnumber=1617373&isnumber=33902>>, Proceedings of the 22nd International Conference on Data Engineering (ICDE 2006), 2006, 12 pages.
Cheng, et al., "EntityRank: Searching Entities Directly and Holistically," retrieved at <<http://www-forward.cs.uiuc.edu/pubs/2007/entityrank-vldb07-cyc-jul07.pdf>>, Proceedings of the 33rd International Conference on Very Large Data Bases, Sep. 2007, 12 pages.
Cohen, et al., "Exploiting Dictionaries in Named Entity Extraction: Combining Semi-Markov Extraction Processes and Data Integration Methods," retrieved on at <<http://www.cs.cmu.edu/~wcohen/postscript/kdd-04-csmm.pdf>>, Proceedings of the Tenth ACM SIGKDD International Conference on Knowledge Discovery and Data mining, Aug. 2004, 10 pages.
Dong, et al., "Reference Reconciliation in Complex Information Spaces," retrieved at <<http://db.cs.washington.edu/semex/reconciliation_sigmod.pdf>>, Proceedings of the 2005 ACM SIGMOD International Conference on Management of Data, 2005, 12 pages.
"Enterprise software," retrieved at <<http://en.wikipedia.org/wiki/Enterprise_software>>, retrieved on Jun. 19, 2012, Wikipedia article, 3 pages.
Ganjam, et al., U.S. Appl. No. 13/413,179, "Entity Augmentation Service from Latent Relational Data," filed Mar. 6, 2012, 54 pages.
Cheng, et al., U.S. Appl. No. 13/487,260, "Robust Discovery of Entity Synonyms Using Query Logs," filed Jun. 4, 2012, 61 pages.
Cheng, et al., U.S. Appl. No. 13/527,601, "Data Services for Enterprises Leveraging Search System Data Assets," filed Jun. 20, 2012, 58 pages.
Yakout, et al., "InfoGather: Entity Augmentation and Attribute Discovery by Holistic Matching with Web Tables," retrieved at <<http://acm.org>>, Proceedings of the 2012 International Conference on Management of Data, May 2012, pp. 97-108.
Ganti, et al., "Entity Catergorization Over Large Document Collections," retrieved at <<http://acm.org>>, Proceedings of the 14th ACM SIGKDD International Conference on Knowledge Discovery and Data Mining, Aug. 2008. pp. 274-282.
Gligorov, et al., "Using Google Distance to Weight Approximate Ontology Matches," retrieved at <<http://www.cs.vu.nl/~frankh/postscript/BNAIC07-WWW07.pdf>>, Proceedings of the 16th International Conference on World Wide Web, 2007, 2 pages.
Han, et al., "Data Mining: Concepts and Techniques," retrieved on at <<http://www.ir.iit.edu/~dagr/DataMiningCourse/Spring2001/BookNotes/4lang.pdf>>, slide presentation, Intelligent Database Systems Research Lab, School of Computing Science, Simon Fraser University, Canada, Jun. 17, 2001, 5 pages.
Hu, Wen-Chu, "ApproxSeek: Web Document Search Using Approximate Matching," retrieved at >>http://citeseerx.ist.psu.edu/viewdoc/download;jsessionid=F776964F00B448D5445A84C3528F0E83?doi=10.1.1.44.8602&rep=1&type=pdf>>, Proceedings of the Fifth International Conference on Computer Science and Informatics, Sep. 1999, 5 pages.
Kasliwal, et al., "Text Mining in Biomedical Literature," retrieved at <<http://www.cse.iitb.ac.in/~sourabh/seminar/final/seminar_report>>, Department of Computer Science and Engineering, Indian Institute of Technology, Bombay, India, 27 pages.

Koudas, et al., "Record Linkage: Similarity Measures and Algorithms," retrieved at <<http://disi.unitn.it/~p2p/RelatedWork/Matching/aj_recordLinkage_06.pdf>>, presentation dated Sep. 23, 2006, 130 pages.
Smeaton, et al., "Experiments on Incorporating Syntactic Processing of User Queries into a Document Retrieval Strategy," retrieved at <<http://acm.org>>, Proceedings of the 11th Annual International ACM SIGIR Conference on Research and Development in Information Retrieval, 1988, pp. 31-51.
"Microsoft Research TechFest 2012: Projects," retrieved at <<http://research.microsoft.com/en-us/events/techfest2012/projects.aspx>>, retrieved on Apr. 10, 2012, Microsoft Corporation, Redmond, WA, 7 pages.
Klapaftis, et al., "Google & WordNet based Word Sense Disambiguation", Workshop on Learning & Extending Ontologies Bonn Germany, Aug. 2005, 5 pages.
Kowalski, et al., "Information Storage and Retrieval Systems: Theory and Implementation", Kluwer Academic Publishers, 2002, 36 pages.
Pasquie, et al., "Efficient Mining of Association Rules Using Closed Itemset Lattices", Elsevier Science Ltd., 1999.
Hipp, et al., "Algorithms for Association Rule Mining—A General Survey and Comparison", ACM SIGKDD Explorations Newletter vol. 2 Issue 1, Jun. 2000, pp. 58-64.
Ananthanarayanan et al., "Rule Based Synonyms for Entity Extraction from Noisy Text", Proceedings of the Second Workshop on Analytics for Noisy Unstructured Text Data, pp. 31-38, 2008.
Appelt et al., "Introduction to Information Extraction Technology", Proceedings of the International Joint Conference on Artificial Intelligence Tutorial, 1999.
Arasu et al., "Transformation-Based Framework for Record Matching" Proceedings of the 24th IEEE International Conference on Data Engineering, pp. 40-49, 2008.
Arasu et al., "Learning String Transformations from Examples", Proceedings of the Publication of Very Large Database Endowment, pp. 2(1):514-525, 2009.
Chaiken et al., "Scope: Easy and Efficient Parallel Processing of Massive Data Sets", Proceedings of Very Large Database Endowment, pp. 1(2)1265-1276, 2008.
Dagan et al., "Contextual Word Similarity and Estimation from Sparse Data", Computer Speech and Language, 9:123-152, 1993.
Dean et al., "MapReduce: Simplified Data Processing on Large Clusters", Communications of the ACM—50th Anniversary Edition, vol. 51 Issue 1, pp. 107-113, Jan. 2008.
Han et al., "Mining Frequent Patterns without Candidate Generation" Proceedings of the 2000 ACM SIGMOD international Conference on Management of Data, pp. 1-12, 2000.
Manning et al., Foundations of Statistical Natural Language Processing, The MIT Press, 1999.
Michelson et al., "Mining Heterogeneous Transformations for Record Linkage", IIWeb, pp. 68-73, AAAI Press, 2007.
Office Action of U.S. Appl. No. 12/478,120, mailed on Feb. 27, 2012, Surajit Chaudhuri, "Identifying Synonyms of Entities Using a Document Collection", 18 pages.
Office Action of U.S. Appl. No. 12/478,120, mailed on Nov. 3, 2011, Surajit Chaudhuri, Identifying Synonyms of Entities Using a Document Collection, 8 pages.
Office Action of U.S. Appl. No. 12/465,832, mailed on Apr. 10, 2012, Surajit Chaudhuri, Identifying Synonyms of Entities Using Web Search, 16 pages.
Office Action of U.S. Appl. No. 12/465,832, mailed on Sep. 19, 2012, Surajit Chaudhuri, Identifying Synonyms of Entities Using Web Search, 15 pages.
Final Office Action of U.S. Appl. No. 12/465,832, mailed on Oct. 7, 2011, Surajit Chaudhuri, Identifying Synonyms of Entities Using Web Search, 13 pages.
Final Office Action of U.S. Appl. No. 12/465,832, mailed on May 23, 2011, Surajit Chaudhuri, Identifying Synonyms of Entities Using Web Search, 19 pages.
Notice of Allowance Dated Jan. 21, 2014 from U.S. Appl. No. 13/487,260, Filed Jun. 4, 2012, Inventor Tao Cheng.

(56) References Cited

OTHER PUBLICATIONS

Lafferty et al., "Conditional Random Fields: Probalistic Models for Segmenting and Labeling Sequence Data", Proceedings of the Eighteenth International Conference on Machine Learning, pp. 282-289, 2001.
Lin, Dekang, "Automatic Retrieval and Clustering of Similar Words", Proceedings of the 17th international Conference on Computational Linguistics, vol. 2, pp. 768-774, 1998.
Cohen, et al., "Learning to Match and Cluster Large High-Dimensional Data Sets for Data Integration", In Proceedings of the Eighth ACM SIGKDD International Conference on Knowledge Discovery and Data Mining, Jul. 23-26, 2002, 6 pages.
Sarawagi, Sunita, "Models and Indices for Integrating Unstructured Data with a Relational Database", In Proceedings of the Workshop on Knowledge Discovery in Inductive Databases, Sep. 20, 2004, 10 pages.
Schallehn, et al., "Efficient Similarity-based Operations for Data Integration", In Journal of Data & Knowledge Engineering, vol. 48, Issue 3, Aug. 12, 2003, 27 pages.
Berlin, et al., "TupleRank: Ranking Discovered Content in Virtual Databases", In Proceedings of 6th International Conference on Next Generation Information Technologies and Systems, Jul. 4-6, 2006, 15 pages.
Madhavan, et al., Corpus-based Schema Matching, 21st International Conference on Data Engineering, Apr. 5-8, 2005, 12 pages.
Venetis, et al., "Recovering Semantics of Tables on the Web", Proceedings of the VLDB Endowment, vol. 4, Issue 9, Jun. 2011, 10 pages.
Ganjam, et al., "InfoGather: Entity Augmentation and Attribute Discovery by Holistic Matching with Web Tables", SIGMOD '12, May 20-24, 2012, Scottsdale AZ, 12 pages.
Bahman, et al., "Fast Personalized Pagerank on Mapreduce", In SIGMOD, Jun. 12-16, 2011, Athens, Greece, 12 pages.
Ghani, et al., "Text Mining for Product Attribute Extraction", SIGKDD Explorations, vol. 8, Issue 1, Jun. 2006, 8 pages.
Bernstein, et al., Generic Schema Matching, Ten Years Later. In VLDB Endowment, vol. 4, No. 11, 2011, 7 pages.
Cafarella, et al., Data Integration for the Relational Web. VLDB, Aug. 24-28, 2009, Lyon, France, 12 pages.
Cafarella, et al., Webtables: Exploring the Power of Tables on the Web, PVLDB, 2008, 12 pages.
Cafarella, et al., "Uncovering the Relational Web", In WebDB, Jun. 13, 2008, Vancouver, Canada, 6 pages.
Doan, et al., "Reconciling Schemas of Disparate Data Sources: A Machine-Learning Approach", In ACM SIGMOD, May 21-24, 2001, 12 pages.
Elsayed, et al., "Pairwise Document Similarity in Large Collections with Mapreduce", In ACL, Jun. 2008, 4 pages.
Gupta, et al., "Answering Table Augmentation Queries from Unstructured Lists on the Web", Proc. VLDB Endowment, Aug. 24-28, 2009, Lyon, France, 12 pages.
He, et al., "Statistical Schema Matching Across Web Query Interfaces", In SIGMOD 2003, Jun. 9-12, 2003, San Diego, CA, 12 pages.
He, et al., "Seisa: Set Expansion by Iterative Similarity Aggregation", In WWW, Mar. 28-Apr. 1, 2011, Hyderabad, India, 10 pages.
Limaye, et al., "Annotating and Searching Web Tables Using Entities, Types and Relationships", VLDB Endowment, vol. 3, No. 1, 2010, 10 pages.
Madhavan, et al., "Generic Schema Matching with Cupid", 27th VLDB Conference, 2001, Roma, Italy, 10 pages.
Page, et al., The Pagerank Citation Ranking: Bringing Order to the Web. Technical Report, Stanford InfoLab, 1998, 17 pages.
Rahm, et al., "A Survey of Approaches to Automatic Schema Matching", The VLDB Journal, 2001, 24 pages.
Yin, et al., "Facto: A Fact Lookup Engine Based on Web Tables", In WWW, Mar. 28-Apr. 1, 2011, Hyderabad, India, 10 pages.
"International Search Report and Written Opinion", PCT/US2013/027203 mailed Jun. 26, 2013, 10 pages.
Loser et al., Augementing Tables by Self-Supervised Web Search, M. Castellanos, U. Dayal, and V. Markl (Eds.): Birte 2010, LNBIP 84, pp. 84-99, 2011.
Feldman et al., "Self-supervised Relation Extraction from the Web," F. Esposito et al. (Eds.): ISMIS 2006, LNAI 4203, pp. 755-764, 2006.
Banko et al, "Open Information Extraction from the Web", Commun. ACM 51, 12 (Dec. 2008), 68-74.
Urbansky et al., "Entity Extractions from the Web with WebKnox," V. Snasel et al. (Eds.): Advances in Intelligent Web Mastering—2, AISC 67, pp. 209-218.
"Response to the Nov. 3, 2011 Non-Final Office Action," From U.S. Appl. No. 12/478,120, Filed Feb. 2, 2012.
"Preliminary Report on Patentability", From PCT Application No. PCT/US2013/027203 Mailed Sep. 9, 2014.
"PageRank," retrieved at <<http://en.wikipedia.org/wiki/PageRank>>, Wikipedia article, retrieved on Sep. 11, 2008.
Arasu, et al., "PageRank Computation and the Structure of the Web: Experiments and Algorithms," retrieved at <<http://www2002.org/CDROM/poster/173.pdf>>, Proceedings of the Eleventh International World Wide Web Conference, 2002, 5 pages.
Artiles, et al., "WePS-3 Evaluation Campaign: Overview of the Web People Search Clustering and Attribute Extraction Tasks," retrieved at <<http://citeseerx.ist.psu.edu/viewdoc/download?doi=10.1.1.174.3094&rep=rep1&type=pdf>>, Proceedings of CLEF, 2010, 15 pages.
Bhattacharya, et al., "Collective Entity Resolution in Relational Data," retrieved at <<http://linqs.cs.umd.edu/basilic/web/Publications/2007/bhattacharya:tkdd07/bhattacharya-tkdd.pdf>>, ACM Transactions on Knowledge Discovery from Data, vol. 1, No. 1, 2007, 35 pages.
Brin, et al., "The Anatomy of a Large-Scale Hypertextual Web Search Engine," retrieved at <<http://www.cs.panam.edu/-creilly/courses/CSCI6175-F11/papers/Brin-1998.pdf>>, Proceedings of the Seventh International Conference on World Wide Web 7, 1998, 20 pages.
Bunescu, et al., "Using Encyclopedic Knowledge for Named Entity Disambiguation," retrieved at <<http://www.cs.utexas.edu/-ml/papers/encyc-eac1-06.pdf>>, Proceeding of the 11th Conference of the European Chapter of the Association of Computational Linguistics, 2006, 8 pages.
Chakaravarthy, et al., "Efficiently Linking Text Documents with Relevant Structured Information," retrieved at <<http://www.vldb.org/conf/2006/p667-chakaravarthy.pdf>>, VLDB '06, Proceedings of the 32nd International Conference on Very Large Data Bases, 2006, pp. 667-678.
Cheng, et al., "Entity Synonyms for Structured Web Search," retrieved at <<http://ieeexplore.ieee.org/stamp/stamp.jsp?tp=&arnumber=5963679>>, IEEE Transactions on Knowledge and Data Engineering, No. 99, Jul. 2011, pp. 1-15.
Watanabe, et al., "A Graph-based Approach to Named Entity Categorization in Wikipedia Using Conditional Random Fields," retrieved at <<http://www.aclweb.org/anthology-new/D/D07/D07-1068.pdf>>, Proceedings of the 2007 Joint Conference on Empirical Methods in Natural Language Processing and Computational Natural Language Learning, Jun. 2007, pp. 649-657.
Cucerzan, Silviu, "Large-Scale Named Entity Disambiguation Based on Wikipedia Data," retrieved at <<http://acl.ldc.upenn.edu/D/D07/D07-1074.pdf>>, Proceedings of the 2007 Joint Conference on Empirical Methods in Natural Language Processing and Computational Natural Language, 2007, pp. 708-716.
Dill, et al., "SemTag and Seeker: Bootstrapping the Semantic Web Via Automated Semantic Annotation," retrieved at <<http://what.csc.villanova.edu/-casse1/901OSemanticWeb/SemTag%20and%20-Seeker%20Bootstrapping%20the%20semantic%20web/020via%20automated%20semantic%20annotation.pdf>>, Proceedings of the 12th International Conference on World Wide Web, 2003, 9 pages.
Gale, et al., "One Sense Per Discourse," retrieved at <<http://citeseerx.ist.psu.edu/viewdoc/download;jsessionid=8EA215CDO7B134CA243A22FF6DDA2871?doi=10.1.1.178.2723&rep=rep1&type=pdf>>, Proceedings of the Workshop on Speech and Natural Language, 1992, pp. 233-237.
Gentile, et al., "Graph-based Semantic Relatedness for Named Entity Disambiguation," retrieved at <<http://staffwww.dcs.shef.ac.uk/

(56) References Cited

OTHER PUBLICATIONS people/J.Iria/iria__s3t09.pdf>>, Proceedings of the 1st International Conference on Software, Services and Semantic Technologies (S3T), Oct. 2009, 8 pages.

Gooi, et al., "Cross-Document Coreference on a Large Scale Corpus," retrieved at <<http://acl.1dc.upenn.edu/hltnaacl2004/main/pdf/177__Paper.pdf>>, in HLT-NAACL, 2004, 8 pages.

Han, et al., "Collective Entity Linking in Web Text: A Graph-Based Method," retrieved at <<http://www.nlpr.ia.ac.cn/2011papers/gjhy/gh133.pdf>>, Proceedings of the 34th International ACM SIGIR Conference on Research and Development in Information Retrieval, Jul. 2011, pp. 765-774.

Han, et al., "Named Entity Disambiguation by Leveraging Wikipedia Semantic Knowledge," retrieved at <<http://avss2012.org/cip/ZhaoJunPublications/paper/CIKM2009.NED.pdf>>, Proceedings of the 18th ACM Conference on Information and Knowledge Management, 2009, 10 pages.

Hoffart, et al., "Robust Disambiguation of Named Entities in Text," retrieved at <<http://aclweb.org/anthology-new/D/D11/D11-1072.pdf>>, Proceedings of the 2011 Conference on Empirical Methods in Natural Language Processing, Jul. 2011, pp. 782-792.

Kulkarni, et al., "Collective Annotation of Wikipedia Entities in Web Text," retrieved at <<http://www.cc.gatech.edu/-zha/CSE8801/query-annotation/p457-kulkarni.pdf >>, Proceedings of the 15th ACM SIGKDD International Conference on Knowledge Discovery and Data mining, 2009, pp. 457-465.

Mann, et al., "Unsupervised Personal Name Disambiguation," retrieved at <<http://citeseerx.ist.psu.edu/viewdoc/download-?doi=10.1.1.10.7097&rep=rep1&type=pdf>>, Proceedings of the Seventh Conference on Natural Language Learning at HLT-NAACL 2003, vol. 4, 2003, 8 pages.

Mihalcea, et al., "Wikifyl Linking Documents to Encyclopedic Knowledge," retrieved at <<http://www.cse.unt.edu/rada/papers/mihalcea.cikm07.pdf>>, Proceedings of the Sixteenth ACM Conference on Conference on Information and Knowledge Management, 2007, 9 pages.

Mihalcea, Rada, "Unsupervised Large-Vocabulary Word Sense Disambiguation with Graph-based Algorithms for Sequence Data Labeling," retrieved at <<http://www.aclweb.org/anthology-new/H/H05/H05-1052.pdf>>, Proceedings of Human Language Technology Conference and Conference on Empirical Methods in Natural Language Processing (HLT/EMNLP), Oct. 2005, pp. 411-418.

Milne, et al., "Learning to Link with Wikipedia," retrieved at <<http://citeseerx.ist.psu.edu/viewdoc/download?doi=10.1.1.148.3617&rep=rep1&type=pdf>>, Proceedings of the 17th ACM Conference on Information and Knowledge Management, 2008, 10 pages.

Nadeau, et al., "Unsupervised Named-Entity Recognition: Generating Gazetteers and Resolving Ambiguity," retrieved at <<http://cogprints.org/502511/NRC-48727.pdf>>, Proceedings of 19th Conference of the Canadian Society for Computational Studies of Intelligence, Jun. 7, 2006, pp. 266-277.

Sarmento, et al., "An Approach to Web-scale Named-Entity Disambiguation," accessible at <<http://sigarra.up.pt/feup/publs__pesquisa.show__publ__file?pct__gdoc__id=68610.>>, Proceedings of the 6th International Conference on Machine Learning and Data Mining in Pattern Recognition, 2009, 15 pages.

Wang, et al., "Targeted Disambiguation of Ad-hoc, Homogeneous Sets of Named Entities," retrieved at <<http://acm.org>>, Proceedings of the 21st International Conference on World Wide Web, Apr. 2012, pp. 719-728.

"Non-Final Office Action," From U.S. Appl. No. 131487,260, Mailed Mar. 7, 2013.

"Response to the Mar. 7, 2013 Non-Final Office Action," From U.S. Appl. No. 13/487,260, Filed Aug. 6, 2013.

"Response to the May 23, 2011 Non-Final Office Action," From U.S. Appl. No. 12/465,832, Filed Aug. 16, 2011.

"Response to the Oct. 7, 2011 Final Office Action," From U.S. Appl. No. 12/465,832, Filed Dec. 22, 2011.

"Response to the Apr. 10, 2012 Non-Final Office Action," From U.S. Appl. No. 12/465,832, Filed Jul. 10, 2012.

"Response to the Sep. 19, 2012 Final Office Action," From U.S. Appl. No. 121465,832, Filed Dec. 18, 2012.

"Response to the Jun. 13, 2013 Non-Final Office Action," From U.S. Appl. No. 121465,832, Filed Jul. 30, 2013.

"Non-Final Office Action," From U.S. Appl. No. 121465,832, Mailed Jun. 13, 2013.

"Final Office Action and Examiner Initiated Interview Summary," From U.S. Appl. No. 12/465,832, Mailed Oct. 21, 2013.

Chaudhuri, et al., "Mining the Web to Facilitate Fast and Accurate Approximate Match", Proceedings of WWW2009, Apr. 20-24, 2009, pp. 1-10.

"Non-Final Office Action," From U.S. Appl. No. 12/779,964, Filed May 14, 2010, Mailed Feb. 14, 2012.

"Response to the Feb. 14, 2012 Non-Final Office Action," From U.S. Appl. No. 12/779,964, Filed Jun. 11, 2012.

"Final Office Action," From U.S. Appl. No. 12/779,964, Mailed Aug. 27, 2012.

"Response to the Aug. 27, 2012 Final Office Action," From U.S. Appl. No. 12/779,964, Filed Nov. 1, 2012.

"Non-Final Office Action," From U.S. Appl. No. 12/779,964, Mailed Nov. 19, 2013.

"Response to the Nov. 19, 2013 Non-Final Office Action," From U.S. Appl. No. 12/779,964, Filed Feb. 18, 2014.

"Final Office Action," From U.S. Appl. No. 12/779,964, Mailed Jun. 3, 2014.

"Response to the Jun. 3, 2014 Final Office Action," From U.S. Appl. No. 12/779,964, Filed Oct. 2, 2014.

Non-Final Office Action Mailed Jan. 15, 2015 From U.S. Appl. No. 13/413,179, 42 Pages.

Voluntary Amendment Filed Feb. 28, 2015 From People's Republic of China Patent Application No. 201380013249.X, 8 Pages.

Egenhofer, M.J., et al., "Determining Semantic Similarity Among Entity Classes from Difference Ontologies", IEEE Transactions on Knowledge and Data Engineering, vol. 15, No. 2, Mar. 1, 2003, pp. 442-456.

"Non-Final Office Action," Mailed Jan. 15, 2015, U.S. Appl. No. 13/527,601, 10 pages.

"Response to Non-Final Office Action Mailed Jan. 15, 2015," Filed Apr. 14, 2015, From U.S. Appl. No. 13/527,601, 12 pages.

"Supplemental EP Search Report Rule 61," Mailed Mar. 4, 2015, From European Patent Application No. 13757813.4, 3 pages.

"Response to the Feb. 27, 2012 Final Office Action," From U.S. Appl. No. 12/478,120, Filed Jun. 27, 2012.

"Response to the Nov. 3, 2011 Non-Final Office Action," From U.S. Appl. No. 12/478,120, Filed Feb. 3, 2012.

"Notice of Allowance", Mailed Jun. 6, 2013 From U.S. Appl. No. 12/478,120, 12 pages.

"Final Office Action," From U.S. Appl. No. 12/465,832, Mailed Oct. 21, 2013, 20 pages.

"Response to Non-Final Office Action Mailed Jan. 15, 2015," From U.S. Appl. No. 13/413,179, Filed Apr. 15, 2015, 23 Pages.

"Non-Final Office Action," From U.S. Appl. No. 12/779,964, Mailed Apr. 29, 2015, 26 pages.

"Notice of Allowance", Mailed Oct. 17, 2013 From U.S. Appl. No. 13/487,260, 11 pages.

Booth et al., "Query Sentences as Semantic (Sub) Networks", 2009 IEEE International Conference on Semantic Computing, 6 pages.

Examination Report Mailed Mar. 11, 2015 from European Patent Application No. 13757813.4, 4 Pages.

Response Filed Apr. 13, 2015 to the Examination Report Mailed Mar. 11, 2015, From European Patent Application No. 13757813.4, 20 Pages.

\* cited by examiner

EXAMPLE OF INPUT DATA FOR ONE ILLUSTRATIVE APPLICATION
202

| MOVIE NAME | ACTOR(S) | DIRECTOR(S) | YEAR |
|---|---|---|---|
| ABLE AND READY: SHOWDOWN IV IN NYC | THOMAS C. BROWN<br>SAM TURNER<br>DON JONES | DANIEL PHELPS | 2007 |
| ACTION TOWN | SANDY SMITH<br>TED MARLOW<br>EDWARD CARTER | SUE SANDERS | 2005 |
| ⋮ | ⋮ | ⋮ | ⋮ |

EXAMPLE OF AN INFORMATION ITEM (A MOVIE NAME) 204

EXAMPLE OF A RELATED SET OF INFORMATION ITEMS (LIST OF ACTORS) 206

FIG. 2

EXAMPLE OF OUTPUT DATA (SYNONYM-EXPANDED DATA)
302

| MOVIE NAME | ACTOR(S) | DIRECTOR(S) | YEAR |
|---|---|---|---|
| ABLE AND READY: SHOWDOWN IV IN NYC<br>• ABLE AND READY<br>• A&R IV<br>• SHOWDOWN IV<br>• SHOWDOWN IN NYC<br>• NEW YORK SHOWDOWN<br>• BRONX BOY IV<br>• BRONX SHOWDOWN IV | THOMAS C. BROWN<br>• TOM BROWN<br>• TC BROWN<br>• BRONX BOY<br>SAM TURNER<br>• SAMMY TURNER<br>• MR. S<br>• MISTER S<br>DON JONES<br>• DO-JO | DANIEL PHELPS<br>• DR. PHELPS | 2007 |
| ACTION TOWN<br>• ACTION CITY<br>⋮ | SANDY SMITH<br>• SANDRA SMITH<br>⋮ | SUE SANDERS<br>⋮ | 2005<br>⋮ |

EXAMPLE OF SET OF
SELECTED SYNONYMS
FOR AN INFORMATION ITEM
(E.G., A MOVIE NAME)
304

FIG. 3

INPUT INFORMATION ITEM (502):
ABLE AND READY: SHOWDOWN
IV IN NYC

GENERATE SET OF k PAGE ITEMS
THAT ARE ASSOCIATED WITH
INFORMATION ITEM (504) :

- $URL_1$
- $URL_2$
- $URL_3$

•
•
•

- $URK_k$

DETERMINE QUERIES USED TO
ACCESS THE k PAGE ITEMS (TO
PROVIDE INITIAL SET OF SYNONYM
CANDIDATES) (506):

- "SHOWDOWN IV"
- ABLE AND READY
- A&R (IV)
- BRONX BOY IV MOVIE
- SHOWDOWN IN NYC
- "BRONX SHOWDOWN IV" REVIEW
- NEW YORK SHOWDOWN
- NEW TOM BROWN MOVIE
- ABLE AND READY REVIEW

•
•
•

FILTER THE INITIAL SET OF
SYNONYM CANDIDATES (508):

- SHOWDOWN IV
- ABLE AND READY
- A&R IV
- BRONX BOY IV
- SHOWDOWN IN NYC
- BRONX SHOWDOWN IV
- NEW YORK SHOWDOWN
- TOM BROWN

•
•
•

RANK THE SET OF SYNONYM
CANDIDATES (510):

- ABLE AND READY
- A&R IV
- SHOWDOWN IV
- SHOWDOWN IN NYC
- NEW YORK SHOWDOWN
- BRONX BOY IV
- BRONX SHOWDOWN IV
-------------- ⇐ THSH
- TOM BROWN

•
•
•

SELECT THE FINAL SET OF
SYNONYMS (512):

- ABLE AND READY
- A&R IV
- SHOWDOWN IV
- SHOWDOWN IN NYC
- NEW YORK SHOWDOWN
- BRONX BOY IV
- BRONX SHOWDOWN IV

FIG. 5

GENERATING SYNONYMS BASED ON QUERY LOG DATA

BACKGROUND

A provider of network-accessible content may provide a table which identifies salient information items pertaining to the content. For example, consider the merely illustrative case of a provider which provides content regarding movies. This provider may provide a table which identifies the movies by listing their titles, actors, directors, and so on. The information items maintained by the table may be structured (or at least partially structured) in the sense that the table can organize the information items using a defined format.

In the above example, a user who wishes to access content regarding a particular movie may submit a query which attempts to identify one or more of the information items discussed above. For example, a user may submit a query that attempts to identify the name of a desired movie, or an actor who appears in the desired movie, or a combination thereof, and so on. However, this type of retrieval tactic is not always successful. The table may identify the titles and actors of the movies using a canonical (standard) form of these entries. A user may not know the precise from in which the table stores the information items. Hence, the user may enter a query which fails to match the way information is expressed in the table. For example, the user may enter an abbreviated form of a movie title, or a nickname associated with a movie actor. This may result in the inability of the user to obtain the information that he or she is seeking.

There are known strategies for broadening a user's input query in an attempt to mitigate the above problems. For example, one known technique can identify queries which are textual variants of the query input by a user. For example, this technique may broaden an input query by removing suffixes and the like, or, more generally, by determining whether there is a matching information item that has a sufficiently small edit distance with respect to the input query. However, this type of technique may not be reliable in the above-described scenario because the common variants of the information items may have weak textual similarity (or virtually no textual similarity at all) with respect to the canonical forms of the information items. For example, the nickname of an actor may have very little textual similarity with his or her formal name. Further, the common variants can vary from the canonical forms by adding extra words, omitting words, and so on. In short, the queries entered by users may be non-trivial variations of the canonical form of the information items.

Another known technique allows a user to manually annotate a canonical form of an information item such that it includes one or more known variants. For example, a user who wishes to advertise a particular merchandise item for sale may list a set of keywords which identify the various ways that people refer to that merchandise item. However, this technique is not fully satisfactory because it requires a user to manually create and maintain the lists of variants. Further, the list of variants may fail to capture the myriad of ways in which the public refers to information items. Moreover, it is difficult to manually capture the most appropriate variants of information items because the most appropriate variants can dynamically change over time.

Known techniques for expanding information items may have yet additional shortcomings.

SUMMARY

An illustrative approach is described for generating synonyms to supplement at least one canonical information item. Users can access network-accessible content using the canonical forms of the information items or the synonyms associated with the canonical forms.

According to one illustrative aspect, the approach uses query log data to identify the synonyms. The query log data, in turn, empirically reflects the way that actual users prefer to refer to information items when making network searches. As such, the approach can improve the ability of users to access desired content, that is, by more reliably tracking the ways in which the users prefer to refer to information items. The approach can also reduce or eliminate the need for users to manually annotate information items with appropriate synonyms.

According to another illustrative aspect, the approach can operate on a set of related information items. For example, the information items may correspond to a set of items pertaining to movies, a set of items pertaining to a particular type of merchandise, and so on.

According to another illustrative aspect, the information items may be organized in the form of structured data or partially structured data.

According to another illustrative aspect, the approach can involve an expansion phase, a clean-up phase, and a reduction phase. In the expansion phase, the approach identifies, for each information item to be expanded, a set of initial synonym candidates. In the clean-up phase, the approach identifies and removes noise from the set of initial synonym candidates (if such noise is present and can be identified), to provide a set of filtered synonym candidate items. In the reduction phase, the approach ranks and applies a threshold to the set of filtered synonym candidate items, to generate, for each information item, a set of selected synonyms.

According to another illustrative aspect, the expansion phase can operate by identifying a list of k page items (e.g., Web pages) associated with each information item. For each page item, the approach can then identify a set of queries that users have used in the past to access the page item. The approach merges the queries associated with the set of k page items to provide the set of initial synonym candidates for a particular information item.

According to another illustrative aspect, the clean-up phase can operate by identifying words (corresponding to any textual features) that appear in the initial set of synonym candidates, but which do not contribute the discriminative characteristics of the synonym candidates. This information is broadly referred to herein as noise. For example, in one application, some of the synonym candidates may include the word "movie," "actor," "new," "review," and so on. These words act as context-sensitive noise that does not contribute to the uniqueness of the synonym candidates. The clean-up phase operates by identifying and removing this type of noise. In one implementation, the clean-up phase can identify the context-sensitive noise by examining a group of synonyms associated with a set of related informational items (such as a set of movie titles). The clean-up phase can operate by identifying the presence of frequently-occurring words in the group of synonyms that do not also appear (or do not frequently appear) in the canonical forms of the information items.

According to another illustrative aspect, the reduction phase can identify various metric factors associated with each of the synonym candidates. The metric factors can be obtained from information extracted from the query log data. For each information item, the reduction phase can then use these metric factors to first rank the synonym candidates, and then apply a threshold to the synonym candidates to cull a final set of synonyms.

According to another illustrative aspect, the approach can act on a single information item, rather than a set of related information items.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows an example of input data that can be operated on by the SGM of FIG. 1.

FIG. 3 shows an example of output data that can be generated by the SGM of FIG. 1, based on the input data shown in FIG. 2.

FIG. 5 shows an example of one manner in which the SGM of FIG. 1 can generate synonyms using a three-phase approach.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

An illustrative approach is described for generating synonyms to supplement at least one information item, such as, but not limited to, a set of related information items. Users can access network-accessible content using canonical forms of the information items or the synonyms associated with the information items. The approach can use a three-phase technique to identify the synonyms. The three-phase technique makes use of a query log data to identify the synonyms.

By virtue of the use of query log data, the synonyms have an increased chance of reflecting the way in which actual users prefer to refer to the information items. This, in turn, may increase the likelihood that queries submitted by the users will be successful in accessing desired network-accessible content. This advantage may apply even in those cases in which the synonyms that the users prefer to use are not textually similar to the canonical forms of the information items.

The approach may further reduce or eliminate the need for users to manually create and maintain synonyms. More generally, the concepts disclosed herein may address one or more of the challenges or problems previously noted, but are not limited to addressing all or any of these challenges or problems.

This disclosure is organized as follows. Section A describes an illustrative system for generating synonyms. The synonyms can be used to facilitate retrieval of network-accessible content. Section B describes illustrative methods that explain the operation of the system of Section A. Section C describes illustrative processing functionality that can be used to implement any aspect of the features described in Sections A and B.

Figure 11:
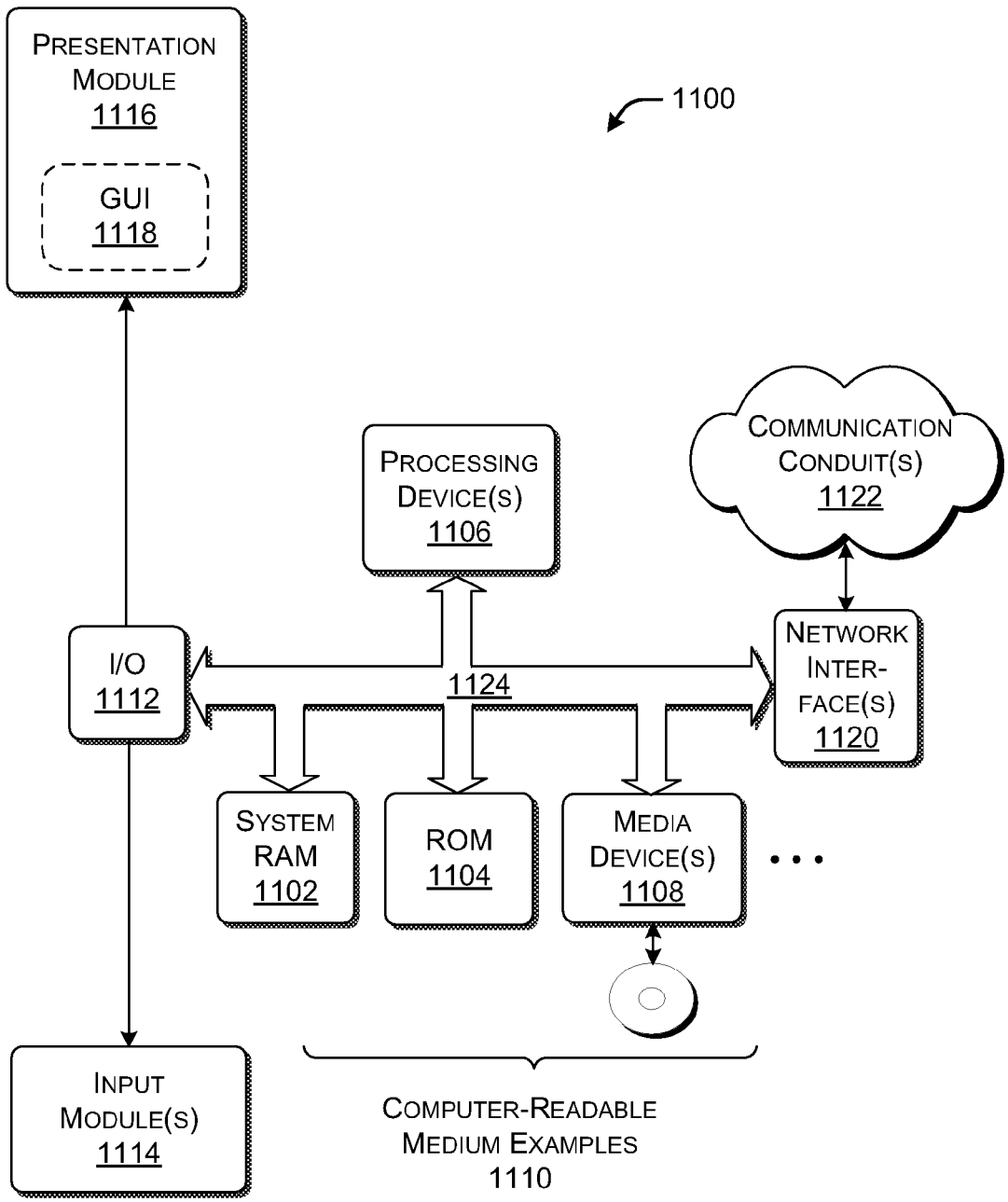
FIG. 11 shows illustrative processing functionality that can be used to implement any aspect of the features shown in the foregoing drawings.

As a preliminary matter, some of the figures describe the concepts in the context of one or more components, variously referred to as functionality, modules, features, elements, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 11, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, firmware, hardware, manual processing, any combination of these implementations, and so on.

As to terminology, the phase "configured to" encompasses any way that any kind of functionality can be constructed to perform an identified operation. The functionality can be configured to perform an operation using, for instance, hardware, software, firmware, etc., and/or any combination thereof.

The term "logic" encompasses any functionality for performing a task. For instance, each operation illustrated in the flowcharts corresponds to logic for performing that operation. In one case, logic may correspond to computer-readable instructions. In another case, logic may correspond to discrete logic components, or a combination of discrete logic components and computer-readable instructions.

The term "set" encompass any collection of items, including zero items, one item, or more than one item.

A. Illustrative Systems

Figure 1:
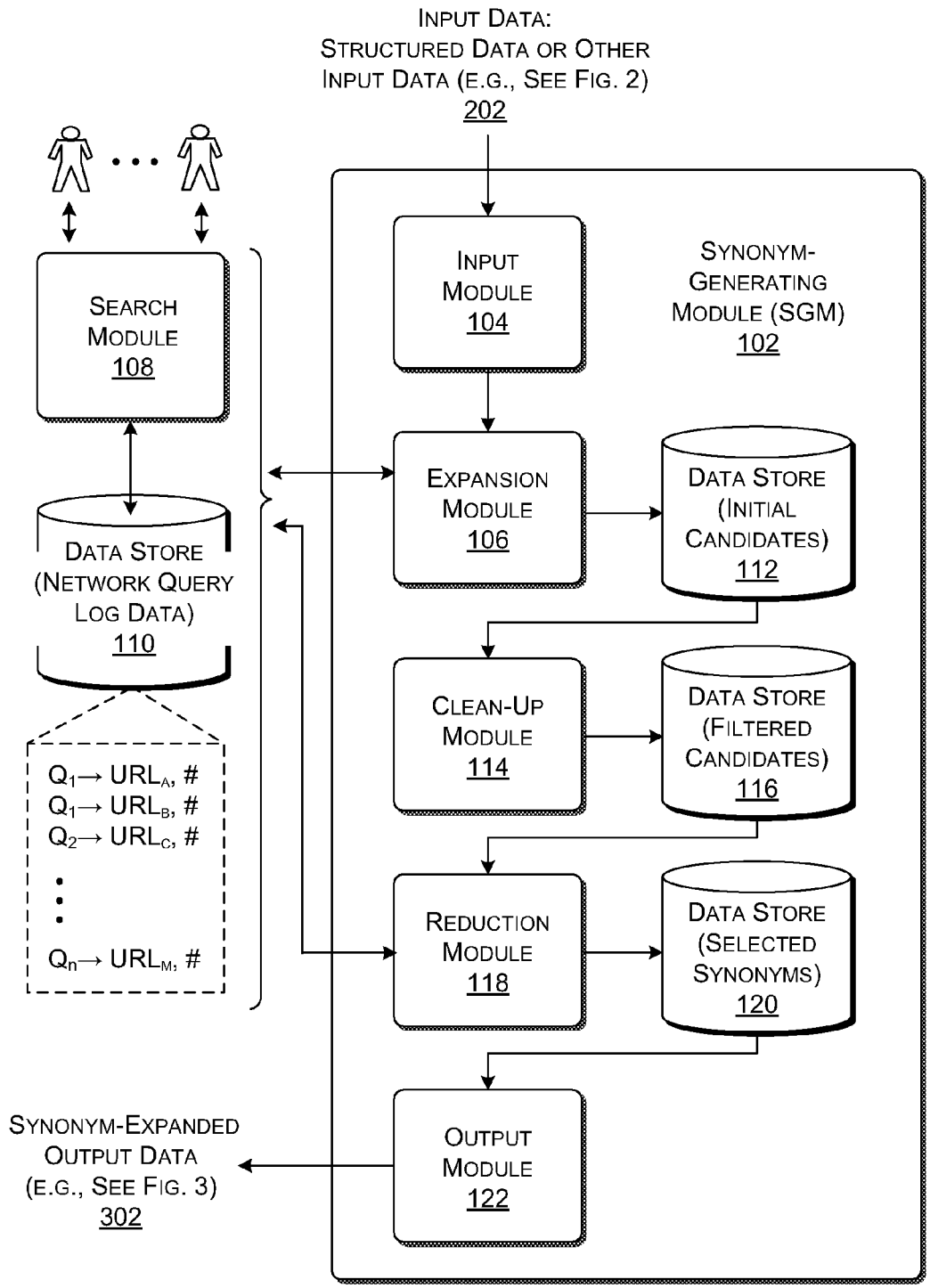
FIG. 1 shows an illustrative synonym-generating module (SGM) for generating synonyms.

FIG. 1 shows a synonym-generating module (SGM) 102 for generating synonyms based on canonical forms of information items. Users can retrieve network-accessible content (e.g., network-accessible Web pages or the like) by entering the canonical forms of the information items or the synonyms.

Before discussing the individual features of the SGM 102, this section will describe illustrative input data that can be fed to the SGM 102 and illustrative output data which can be generated by the SGM 102, as well as processing that can be performed by the SGM 102 on the input data to transform it into the output data. FIG. 2 illustrates one example of the input data, while FIG. 3 illustrates one example of the output data. The examples shown in FIGS. 2 and 3 pertain to information items that can be used to access information regarding movies. However, the principles described with reference to these figures can be applied to any application and any context. More generally, the examples presented herein refer to one illustrative scenario in which the SGM 102 processes input data that includes multiple information items. But the principles described herein can also be applied to the case in which the SGM 102 processes a single information item.

Starting with FIG. 2, this figure shows input data 202 that includes input information items associated with a group of movies. Each information item pertains to a salient piece of information that characterizes a movie. For example, a first column of information items identifies the names of respective movies. A second column of information items identifies the actors associated with the movies. A third column identifies the directors associated with the movies. A fourth column of information items identifies a year-of-release of the movies. Information item 204 is an example of an individual information item (in this case, corresponding to the name of a hypothetical movie entitled, "Able and Ready: Showdown IV in NYC." It will be appreciated that the selection of information items shown in FIG. 2 is merely representative, as is the organization of these information items. Further, to repeat, the SGM 102 can also act on a single information item.

The information items shown in FIG. 2 are canonical in the sense that these information items are expressed in the standard form. For example, the names of the movies correspond to the official names of the movies as specified by the respective studios which have produced the movies.

The information expressed in the input data 202 can be viewed as structured data in the sense that it is organized based on a particular format. In one implementation, the structured data can be represented by using an appropriate markup language, such as the extensible markup language (XML). In this format, a collection of appropriate tags can be used to demarcate elements of information in the input data 202 (e.g., <title>, <actor>, <director>, <year>, etc.). A schema can define how the information items are organized. The schema may optionally allow information items to be omitted or repeated. For example, the schema may accommodate multiple actor elements to be associated with a movie to account for the fact that movies include a variable number of actors. In another implementation, the input data 202 can be at least partially structured, insofar as only part of this input data 202 may be organized according to a defined structure. In another implementation, the input data 202 can be entirely unstructured.

In any case, in one implementation, the input data 202 includes one or more sets of related items. The items in a particular set are related in the sense that they pertain to a common theme (for example, the theme of movie titles for one set, the theme of actors for another set, etc.). For example, column 206 shows a set of information items that are related because they pertain to the category of actors. As will be described, in a clean-up phase, the SGM 102 can examine synonym candidates over an entire set of related items (such as over an entire set of actors). This allows the SGM 102 to identify context-sensitive noise in the set of related items that may be removed from the set synonym candidates (if such context-sensitive noise is present and can be identified).

In use, a user may enter an input query with the intent of retrieving information regarding a particular movie. The user may attempt to identify the movie by specifying one or more information items associated with the movie. For example, the user may attempt to retrieve information regarding the hypothetical movie "Able and Ready: Showdown IV in NYC" by entering the title of this movie. If the user enters the name of the movie exactly as it appears in the input data 202, then a search module can match the query with the appropriate information item in the input data 202 and provide the desired movie information to the user. However, with such a long title, the user may fail to enter the name of movie in the exact form that it is specified in the input data 202. In this circumstance, the search module may fail to identify the correct movie in the input data 202, and may thus potentially fail to provide the user with the desired movie information.

FIG. 3 shows illustrative output data 302 provided by the SGM 102. In this example, the SGM 102 has supplemented the original canonical forms of the information items with synonyms of the information items. As such, the output data 302 can be viewed as a synonym-expanded version of the input data 202.

For example, consider the information item 204 of FIG. 2, which provides the canonical name of the longish movie title, "Able and Ready: Showdown IV in NYC." The SGM 102 identifies a set of synonyms 304, providing the hypothetical movie title variants, "Able and Ready," "A&R IV," "Showdown IV," "Showdown in NYC," "New York Showdown," and "Bronx Boy IV." The last synonym may reflect a character name in this hypothetical movie (indicating that some members of the public may have come to associate this movie with its principal actor, rather than its proper movie title). In a similar fashion, the SGM 102 can provide synonyms for the information items in other columns of the output data 302, such as actors, directors, and so on.

As a general feature, note that the synonyms may not represent simple textual variants of the canonical forms of the information items. For example, the actor "Sam Turner" may go by the nickname "Mr. S." This nickname is not a simple textual variant of the canonical form of the name. Further note that the synonyms can have additional words than the canonical form of the information item, or fewer words, or the same number of words.

Figure 4:
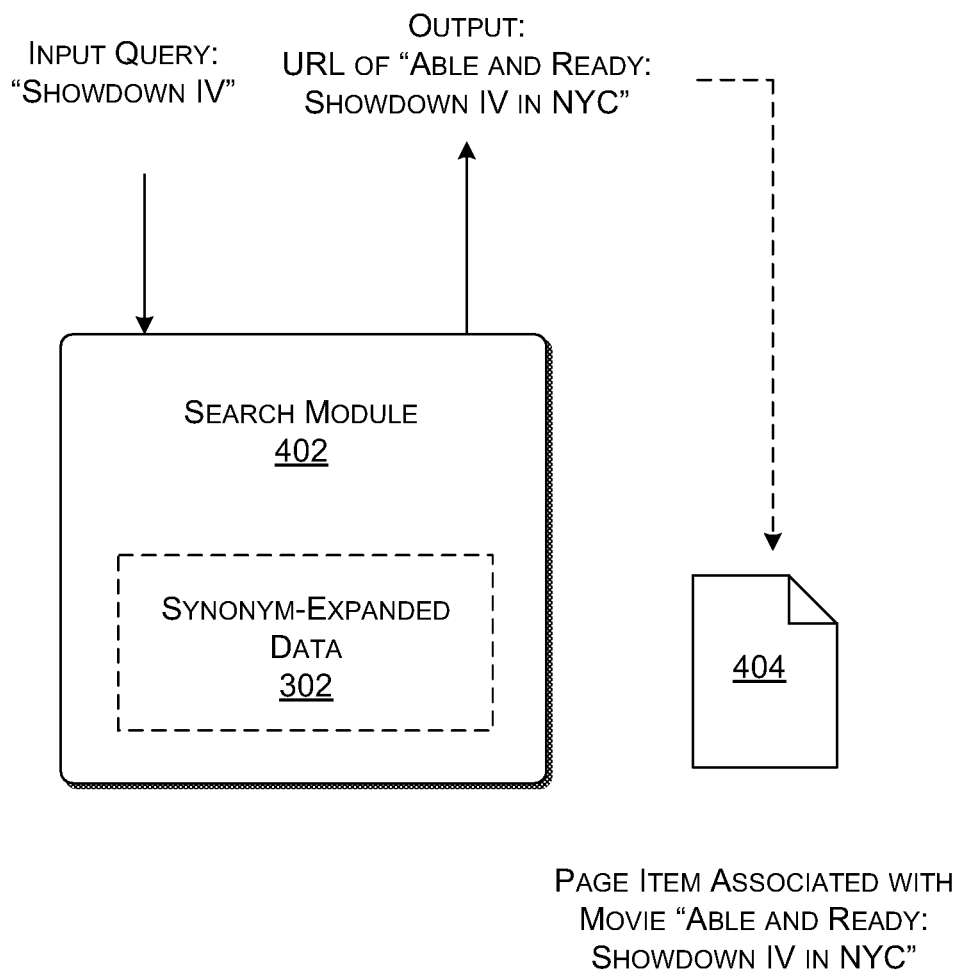
FIG. 4 shows an example of how the output shown in FIG. 3 can be used to facilitate a user's attempt to access network-accessible content.

FIG. 4 shows how a search module 402 can use the synonym-expanded data output data 302 shown in FIG. 3 to respond to a user's search. For example, suppose that a user inputs an abbreviated name of a movie, such as "Showdown IV." The search module 402 can determine that this input query corresponds to a synonym of the movie title "Able and Ready: Showdown IV in NYC." As such, the search module 402 can provide the URL (or other identifying information) associated with the movie "Able and Ready: Showdown IV in NYC." Based on this URL, the user can retrieve a page item 404 (e.g., a Web page or the like) associated with the desired movie. As can be appreciated, the use of the synonym-expanded output data 302 allows a user to more reliably access desired movies, e.g., by reducing the chances that the search module 402 will not be able to interpret the user's query. Moreover, the SGM 102 can generate the synonyms without any manual intervention by the user, or with a reduced amount of manual intervention.

FIG. 5 illustrates one example of how the SGM 102 can generate a set of synonyms for the movie title "Able and Ready: Showdown IV in NYC." The same procedure can be performed for each of the other information items in the input data 202 (of FIG. 2). The procedure can include three phases (or can be conceptualized to include three phases). The phases are: an expansion phase; a clean-up phase; and a reduction phase. Further, although not shown, the procedure of FIG. 5 can be applied to a single information item, rather than a set of information items.

In operation 502, the SGM 102 identifies an information item to operate on—in this case, the movie title "Able and Ready: Showdown IV in NYC." For example, the SGM 102 can operate on the input data 202 on a column-by-column basis, processing the information items in each column in turn.

In operation 504, the SGM 102 commences the expansion phase of the procedure. In the expansion phase, the SGM 102 expands the information item "Able and Ready: Showdown IV in NYC" into a set of initial synonym candidates. These synonyms are candidates in the sense that they have not yet been formally selected to appear in the synonym-expanded output data (e.g., in the output data 302).

The SGM 102 can generate the set of synonym candidates in various ways. In one technique, the SGM 102 can first submit the information item to a search module as a search query. The search module can respond by returning a set of page items (such as Web pages). Each of these page items contains the information item (e.g., "Able and Ready: Showdown IV in NYC") as part thereof, or each of these page items is otherwise associated with the information item in some way. The SGM 102 can then select the top k page items in the search results returned by the search engine. More specifically, in one implementation, the search module can return a set of page items by identifying a set of URLs (or other page identifiers) that are associated with the page items. The SGM 102 can select the top k of those URLs. (But to facilitate explanation, operation 504 is described in generic terms as the identification of a set of k page items, rather than a set of k URLs.) The number k of page items that is selected can be adjusted to provide satisfactory performance based on various environment-specific factors.

The SGM 102 can obtain a list of page items in other ways, e.g., without asking a search module to perform a search. For example, the SGM 102 can identify the k page items based on query log data. The query log data identifies the queries that have been previously used by a group of users to access different respective page items (e.g., Web pages). The SGM 102 can use this query log data to map the query "Able and Ready: Showdown IV in NYC" to the page items which contain this information item or which are otherwise associated with this information item. Still other ways of identifying the k page items are possible.

In operation 506, the SGM 102 determines, for each entry in the list of k page items, a set of queries which have been previously used to access the page item. For example, assume that one page item corresponds to a hypothetical online newspaper review of the movie "Able and Ready: Showdown IV in NYC." The SGM 102 can identify a list of queries that were used by the general public to access this newspaper review. The list of queries may contain the canonical form of the movie title as one member thereof. The list of queries may also include one or more variants of the canonical form, such as the query "Showdown IV." That is, at least one user may have accessed the newspaper article by inputting the query "Showdown IV" instead of the canonical form of the movie title. In one case, the search module can identify a potentially large number of queries that have been used to access the page item; the SGM 102 can retain a subset of these queries that are deemed to be the most viable synonym candidates. The type of considerations that can be used to assess the appropriateness of synonym candidates is described in Section B (with reference to the reduction phase of the processing).

As a result of the above-described processing being performed on all of the k page items, for each information item, the SGM 102 provides a master list of queries that have been used to access one or more of the page items in the list of k page items. The SGM 102 can remove any redundant queries that may appear in the master list. In some cases, a query in the master list may have been used to access only a single page item in the list of k page items. In other cases, a query in the master list may have been used to access two or more page items in the list of k page items. Further, the master list identifies how many times each query was used to access one or more of the k page items. The master list of queries is referred to as a set of initial synonym candidates herein. The remainder of the process examines these synonym candidates to determine whether they are indeed suitable variants for the canonical form of the information item.

The SGM 102 can use the above-described query log data to identify the queries in the initial set of synonym candidates. In one case, a search module (or multiple search modules) can be used to provide the query log data. As described above, the query log data provides a historical record of the queries that users entered over a span of time. For example, the users may correspond to members of the public. The query log data also correlates the queries with the page items that users "clicked on" (or otherwise activated) in response to their queries. The query log data can also provide count information that indicates how many instances of a particular query resulted in the activation of a particular page item.

In general terms, the approach described above has the effect of treating the k page items as proxies for the information items that appear in the input data 202. The approach also has the effect of treating the queries made by a large group of users as a reliable indication of suitable synonyms for the information items. Users may change the way in which they refer to particular information items over time. This means that the SGM 102 can dynamically change the list of synonym candidates that are deemed appropriate variants of the information items over time.

In operation 508, the SGM 102 commences the filtering phase of the procedure. In the filtering phase, the SGM 102 removes noise from the initial set of synonym candidates (if such noise is determined to be present in the synonym candidates). Noise broadly encompasses any textual feature of the set of initial set of synonym candidates that does not contribute to the distinguishing characteristics of the synonym candidates. The outcome of the filtering phase performed by the SGM 102 is a filtered set of synonym candidates.

A first class of noise corresponds to known noise characters (e.g., common noise). This is content that is typically considered noise in all contexts. For example, as shown in operation 508, the SGM 102 has removed the presence of quotation marks and parentheses from the initial set of synonym candidates. Other known noise characters can correspond to "www," question marks, and so on. Other common noise components can correspond to stop words, such as propositions, articles, etc. (where a "common noise component" refers to a particular feature of the common noise).

In operation 508, the SGM 102 also identifies set-specific textual information that does not contribute to the uniqueness of the synonym candidates (referred to as context-sensitive noise herein). For example, as shown in operation 506, the SGM 102 has removed the context-sensitive noise components "movie" and "review" from the initial set of synonym candidates (where a "context-sensitive noise component" refers to a particular feature of the context-sensitive noise). The SGM 102 can identify the presence of these context-sensitive noise components by first determining whether there are frequently-used words in a group of synonym candidates associated with a related set of information items (or some subset thereof). In the example of FIG. 5, the SGM 102 determines whether there are commonly-used words in the group of synonym candidates associated with all of the movie titles identified in the first column of the input data 202. The SGM 102 can then determine whether these context-sensitive noise components fail to also frequently appear in the canonical forms of the information items. For example, assume that the user inputs the query "Able and Ready Review." It is unlikely that many (if any) of the canonical forms of movie titles in the input data 202 include the word "Review." This suggests that the word "Review" has little (or no) descriptive value in identifying the desired movie. Once the SGM 102 identifies such context-sensitive noise word components, it can remove them from the list of initial set of candidate items. Note that, in this illustrative implementation, the filtering operation takes into account a list of related items, and therefore is based on a more global analysis of the information items in the input data 202 compared to the expansion phase discussed above.

By virtue of removing noise in the clean-up phase (if present), the SGM 102 creates new synonym candidates. For example, the SGM 102 can remove the word "Review" (a context-sensitive noise component) and quotations (a common noise component) from the original synonym candidate ""Bronx Showdown IV" Review" to create the new synonym candidate "Bronx Showdown IV", which does not appear in the original candidate set. Moreover, by removing the word "Review" from the original synonym candidate "Able and Ready Review", this synonym candidate now is identical to another original synonym candidate, namely "Able and Ready." The clean-up phase can address this issue by consolidating the two synonym candidates into one. Specifically, the clean-up phase can merge the statistics associated with the two original synonym candidates to provide aggregated statistical information (since the synonym candidates actually pertain to the same synonym candidate). This operation has the effect of bolstering the importance of the resultant consolidated synonym candidate ("Able and Ready") in the reduction phase (as described below).

In other cases, the SGM 102 can dispense with the filtering phase corresponding to operation 508. If the filtering phase is not performed, the reduction phase can act directly on the output of the expansion phase. In this case, the filtered set of synonym candidates is the same as the initial set of synonym candidates (meaning that no filtering has been performed).

Alternatively, the SGM 102 can remove the common type of known noise components, without also removing the context-sensitive noise. For example, consider the case in which the SGM 102 acts on a single information item (that does not belong to a related set of information items). In this case, the SGM 102 can remove common noise from the synonym candidates, but, in one implementation, cannot remove context-sensitive noise (because there is no set of related items from which to assess the presence of context-sensitive noise). Alternatively, even in this scenario, the SGM 102 can perform some kind of global analysis by detecting that the singular information item pertains to a class of information items, and then performing the filtering analysis with respect to a representative sample of information items in this class. For example, assume that filtering analysis is to be performed on input data that consists of only one movie title. The SGM 102 can perform a lookup operation to determine that the information item is a movie title, and can then perform the filtering phase with respect to a stock group of movie titles. In other words, the other members of a related set do not need to be supplied along with the input data. In other cases, the SGM 102 can pre-determine context-sensitive noise components for different categories.

In operation 510, the SGM 102 commences the reduction phase of the procedure. In general, one purpose of this phase is to reduce the number of synonym candidates generated in the expansion phase. The SGM 102 reduces the set of synonym candidates to a final set of synonyms that are deemed to be appropriate proxies for the canonical forms of the information items, omitting the synonym candidates that are determined to be of lesser appropriateness.

More specifically, in operation 510, for each information item, the SGM 102 first ranks the synonym candidates in the filtered list of synonym candidates identified in the filtering phase. To this end, the SGM 102 can obtain one or more metric factors from the query log data described above. The SGM 102 can rank the synonym items on the basis of one or more of these metric factors. Section B will provide additional details regarding one way in which the SGM 102 can rank the synonym candidates.

In operation 512, for each information item, the SGM 102 can select a predetermined number of the top-ranked synonym candidates for inclusion in a final set of synonyms. This operation can be performed by defining a threshold (THSH) for the set of synonym candidates; the candidates that are ranked above this threshold are included, while candidates below the threshold are excluded. Again, the SGM 102 can perform this selection operation based on the metric factors obtained from the query log data. Section B will provide additional details regarding one way in which the SGM 102 can apply thresholds to the synonym candidates so as to cull a desired set of final synonyms.

With the above introduction in the form of a concrete example, the discussion now returns to the component diagram of FIG. 1. The SGM 102 illustrated in this figure can be used to implement the example described above, but it can also be applied in many other environments, and to address many other scenarios. For instance, the SGM 102 is not limited to movie data, nor is it limited to the particular organization of data shown in FIGS. 2 and 3. More generally, the SGM 102 can be applied to structured data, partially structured data, or entirely unstructured data. Further, the SGM 102 can be applied to processing a single information item.

The SGM 102 includes an input module 104 for receiving the input data (e.g., the data to be processed), such as input data 202 of FIG. 2. The input module 104 can also parse the input data into sections (e.g., columns in one case), and coordinate the processing of the sections on a section-by-section basis. Alternatively, or in addition, the input module 104 can coordinate the processing on these sections so that they are processed in a parallel manner. For input that includes multiple information items, a section may contain a list of related information items, such as a list of movie titles, a list of actors, and so on.

An expansion module 106 performs the expansion phase of the synonym-related processing. That is, the expansion module 106 can expand each information item identified by the input module 104 into a set of initial synonym candidates. As explained above, the expansion module 106 can perform this task by submitting each information item (e.g., the name of a movie) to a search module 108 as a query. In response, the search module 108 can identify k page items (e.g., Web pages) that contain the information item or are otherwise associated with the information item. Then, for each page item in the list of k page items, the expansion module 106 can determine the queries that have been made (by a plurality of users) which have resulted in the activation of the page item.

The expansion module 106 can perform this task by accessing a data store 110 that provides query log data. The query log data provides a history of queries submitted to the search module 108, and also correlates the queries with the page items (e.g., Web pages) that were clicked on in response to the queries. As a result of the processing performed on the set of k page items, the expansion module 106 forms a combined set of initial synonym candidates. The expansion module 106 stores the set of initial synonym candidates in a data store 112.

A clean-up module 114 performs the filtering phase of the synonym-related processing. That is, the clean-up module 114 identifies and removes noise in the set of initial synonym candidates. A first class of noise refers to common noise, such as quotations marks, question marks, parentheses, the letters "www," and so on. The first class can also include known stop words (e.g., articles, prepositions, etc.). A second class of noise refers to set-specific context-sensitive noise. In the manner described above, the clean-up module 114 identifies these types of context-sensitive noise components by determining the presence of frequently-occurring words in the synonym candidates that do not also add meaningful content to the synonym candidates. The second class of noise is as set-specific because the clean-up module 114 performs this clean-up analysis with respect to a group of related information items, such as a group of items in a column of the input data. Illustrative such context-sensitive noise components in the movie title column of the input data may correspond to "movie," "review," and so on. The clean-up module 114 removes the noise and stores a resultant set of filtered synonym candidates in a data store 116. The clean-up module 114 can also merge identical synonym candidates (and associated statistics) in the manner described above.

A reduction module 118 performs the reduction phase of the synonym-related processing. The reduction module 118 can optionally perform this processing in two stages. In a first operation, for each information item, the reduction module 118 can rank the synonym candidates (in the set of filtered synonym candidates) in order of appropriateness. This creates a set of ranked synonym candidates for each information item. In a second phase, for each information item, the reduction module 118 can select a set of final synonyms from the set of ranked synonym candidates by applying one or more thresholds to the set of ranked synonym candidates. In performing these operations, the reduction module 118 can obtain and apply one or more metric factors from the query log data in the data store 110. The manner in which the reduction module 118 operates (in one implementation) will be described in Section B below. The reduction module 118 stores the results of its ranking and threshold-based-selection in a data store 120. That is, the data store 120 provides a final list of synonyms for each information item.

An output module 122 uses the final set of synonyms identified by the reduction module 118 to supplement the canonical forms of the information items in the input data. This operation creates synonym-expanded output data, such as the output data 302 of FIG. 3.

The SGM 102 can perform the above-described processing based on any triggering event. In one case, the SGM 102 can perform the processing on a periodic basis (e.g., once a month). Alternatively, or in addition, the SGM 102 can perform the processing when manually instructed to do so. In some cases, it is also possible to perform the analysis in response to the user submitting a query.

In the above examples, the SGM 102 identifies synonyms for the purpose of facilitating a user's subsequent search. The SGM 102 can also be applied to other uses. For example, consider the case in which there is a significant overlap in two sets of synonyms associated with two respective information items in the input data. In this case, the SGM 102 can assume that the two information items likely describe the same information. The SGM 102 can then decide to merge the two information items into a single entry. Generally, the SGM 102 can apply the above-type of analysis to identify redundant entries in the input data and to subsequently eliminate such entries. Still other applications of the SGM 102 are possible.

B. Illustrative Processes

FIGS. 6-10 describe the operation of the synonym-generating module (SGM) 102 of FIG. 1 in flowchart form. Since the principles underlying the operation of the SGM 102 have already been described in Section A, this section will serve mostly as a summary of the operation of the SGM 102, except with respect to FIG. 9 which provides additional details regarding the operation of the reduction phase of the procedure.

Figure 6:
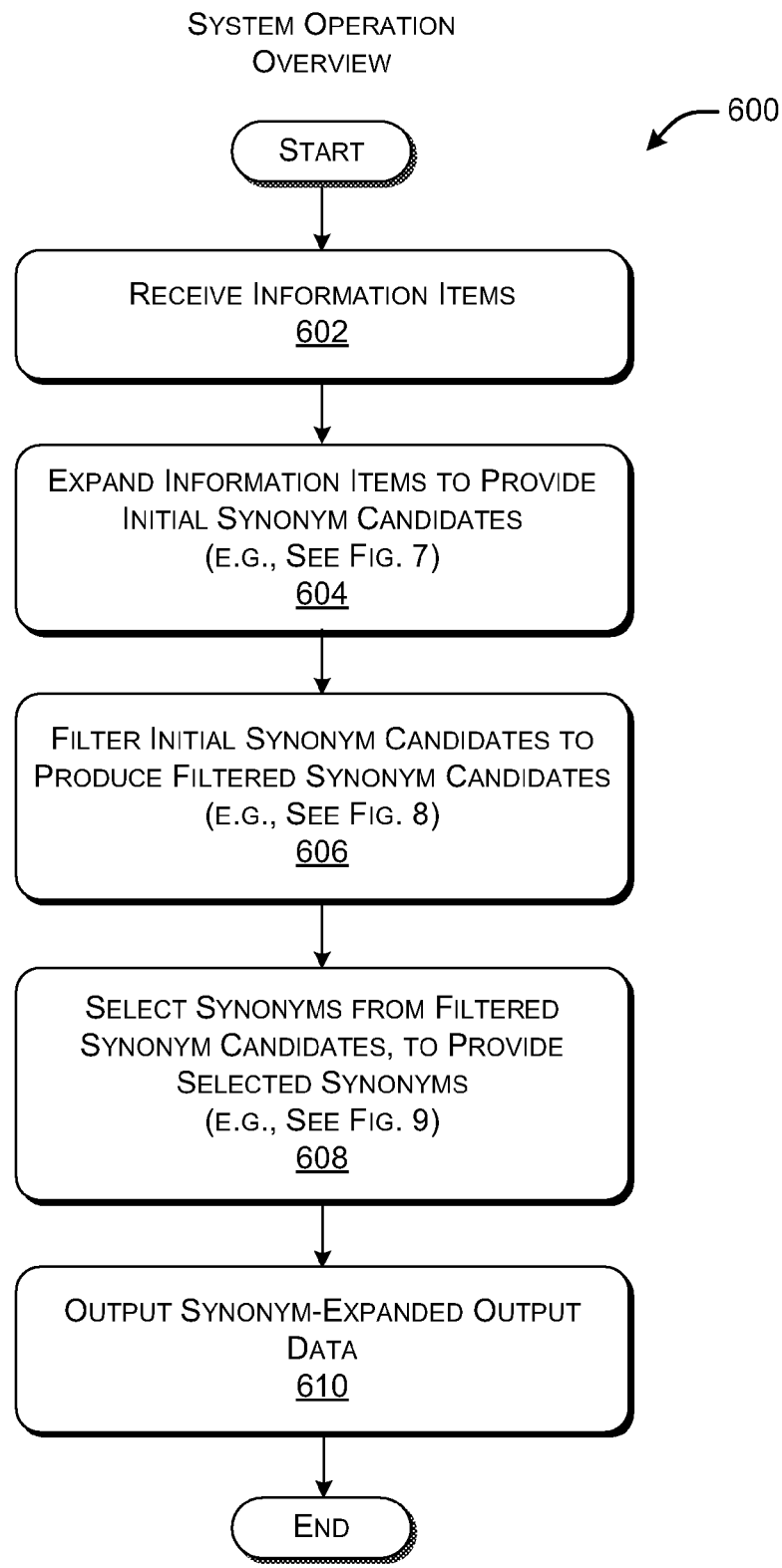
FIG. 6 is an illustrative procedure that describes an overview of one manner of operation of the system of FIG. 1.

FIG. 6 is an illustrative procedure 600 which provides an overview of the overall process performed by the SGM 102. As stated, in one implementation, the procedure 600 includes three phases (an expansion phase, a clean-up phase, and a reduction phase).

In block 602, the SGM 102 receives input data, which can represent structured data, partially structured data, or unstructured data. The data can include one or more related sets of information items, such as a list of movies, a list of actors, and so on. Or the input data can include a single information item.

In block 604, the SGM 102 expands each information item in the input data into a set of initial synonym candidates. This operation corresponds to the expansion phase of the procedure 600, which is described in greater detail in FIG. 7.

In block 606, the SGM 102 filters the initial synonym candidates to remove noise from these synonym candidates. This operation corresponds to the clean-up phase of the procedure 600, and is described in greater detail in FIG. 8.

In block 608, the SGM 102 reduces the synonym candidates to a set of appropriate synonyms (e.g., by ranking the synonyms and applying one or more thresholds to the synonyms). This operation corresponds to the reduction phase of the procedure 600, which is described in greater detail in FIG. 9.

In block 610, the SGM 102 uses the synonyms identified in the reduction phase to create the synonym-expanded output data. FIG. 3 provides an example of such synonym-expanded output data.

Figure 7:
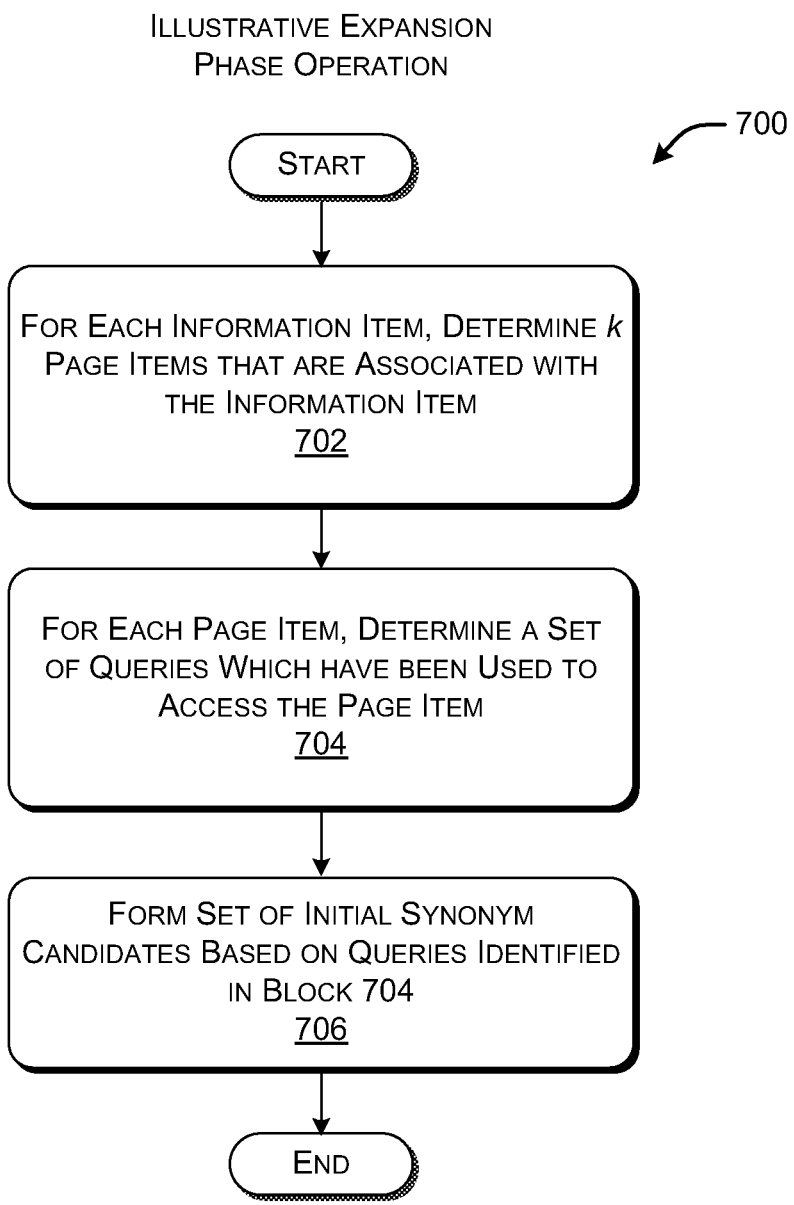
FIG. 7 is an illustrative procedure that describes one manner in which an expansion phase of the procedure of FIG. 6 can be performed.

FIG. 7 is an illustrative procedure 700 which provides further information regarding the expansion phase of the overall process 600.

In block 702, the SGM 102 determines k page items (e.g., Web pages) that are associated with each information item in the input data. One way that the SGM 102 can perform this task is to submit each information item as a query to the search module 108, upon which it receives k page items which contain this information item or are otherwise associated with the information item. More specifically, the search module 108 can return a list of k URLs (or other network addresses) which respectively identify the page items.

Figure 9:
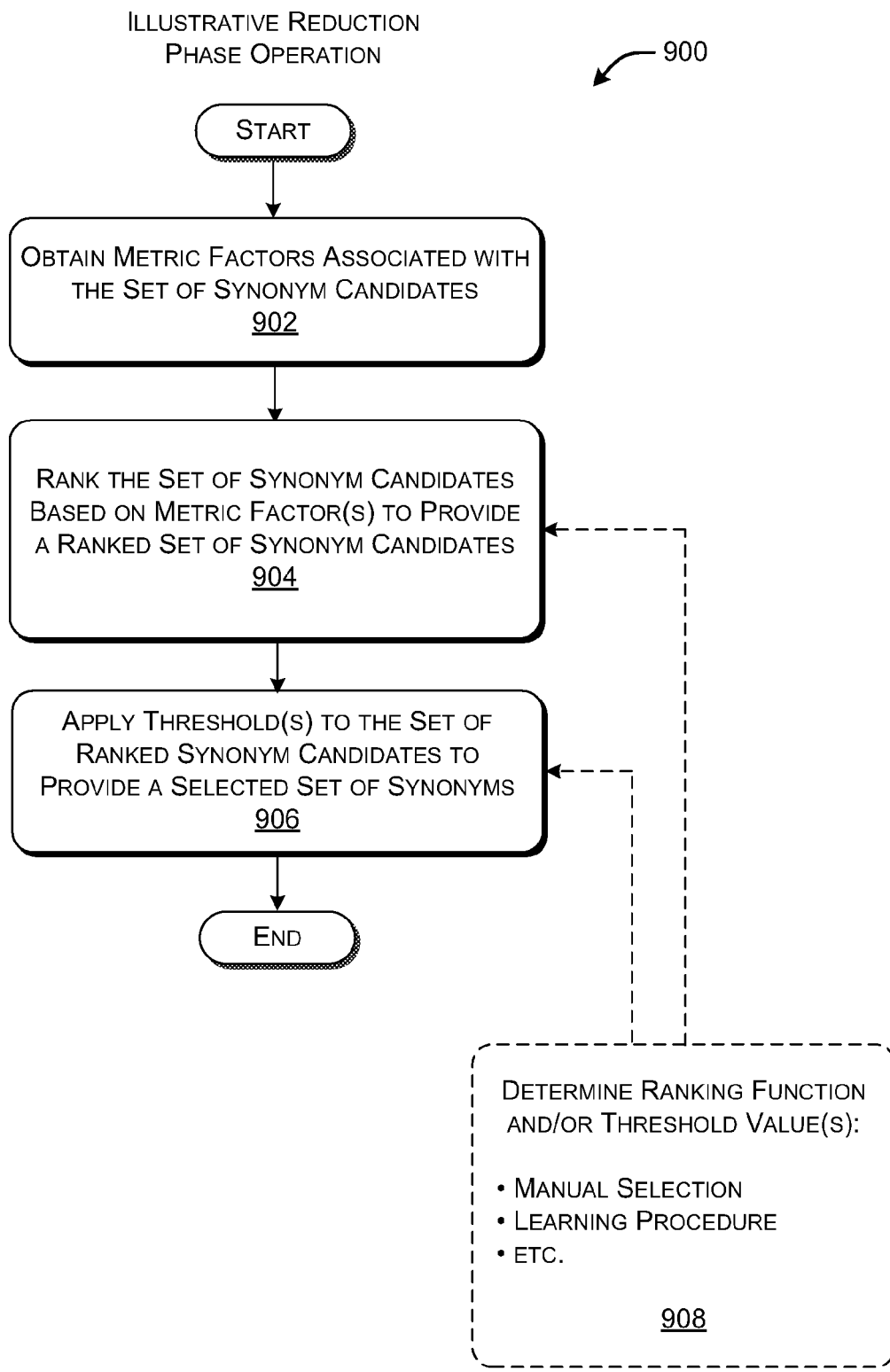
FIG. 9 is an illustrative procedure that describes one manner in which a reduction phase of the procedure of FIG. 6 can be performed.

In block 704, for each of the k page items, the SGM 102 determines a set of queries that are associated with the page item. In one case, these queries correspond to search queries that users have previously submitted to access the page item, as revealed by the query log data. More specifically, for each page item, the SGM 102 can retain a subset of the identified queries identified by the query log data. The SGM 102 can retain that subset of queries which are most strongly linked to the activation of the page item. The SGM 102 can make this determination, in turn, based on one or more metric factors obtained from the query log data. FIG. 9 describes processing of metric factors that can be performed in the context of the reduction phase; related analysis can be performed in the present context of the expansion phase to select a group of queries from a larger group of queries.

In block 706, for each information item, the SGM 102 forms a set of initial synonym candidates by combining the queries identified in block 704 for all of the k page items. In other words, the collected queries correspond to synonym candidates.

Figure 8:
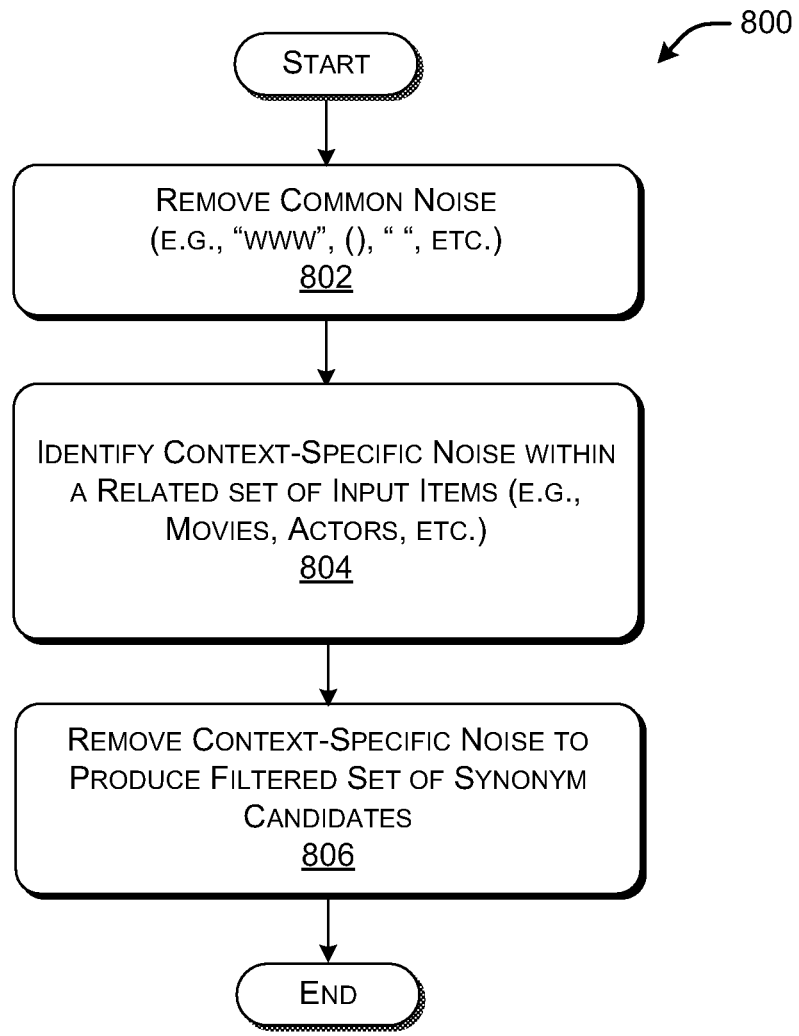
FIG. 8 is an illustrative procedure that describes one manner in which a clean-up phase of the procedure of FIG. 6 can be performed.

FIG. 8 is an illustrative procedure 800 which provides further information regarding the clean-up phase of the overall process 600.

In block 802, the SGM 102 removes common noise from the set of initial synonym candidates, such as parentheses, quotation marks, question marks, the characters "www," stop words, and so on.

In block 804, the SGM 102 identifies and removes context-sensitive noise components in the set of initial synonym candidates. The SGM 102 performs this analysis with respect to a group of related items, such as movies, actors, and so on.

In block 806, the SGM 102 generates a set of filtered synonym candidates. This set is the same as the initial set of synonym candidates, except that the identified noise components have been removed. Although not shown, the SGM 102 can also merge identical synonym candidates (and associated statistics) in the manner described above.

FIG. 9 is a procedure 900 which provides further information regarding the reduction phase of the overall process 600.

In block 902, the SGM 102 obtains metric factors associated with each synonym candidate. In one case, the SGM 102 can obtain these metric factors from the query log data maintained by the search module 108 in the data store 110. In some cases, the SGM 102 can obtain the desired metric factors directly from the query log data. In other cases, the SGM 102 can derive the desired metric factors by performing calculations on the query log data.

One type of metric factor that can be derived from the query log data corresponds to a log likelihood query factor. This metric factor can be calculated as follows. First, the probability that synonym candidate l (associated with a query l) is a synonym of a value v, observing document d in a collection $D_v$, can be provided by:

$$P(l \simeq v \mid d) = \frac{f_{ld}}{\sum_{q \in Q_d} f_{qd}}. \qquad (1)$$

More specifically, $D_v$ refers to a collection of documents associated with a value v. For example, $D_v$ could correspond to the k page items obtained in block 702 associated with the value v (where the value v corresponds to the canonical form of the information item). Further, $Q_d$ refers to all of the queries that result in a click on document d, $f_{ld}$ refers to a number of times document d is clicked for query l, and $f_{qd}$ refers to a number of times document d is clicked for query q. In effect, equation (1) states that the probability of query l being a synonym for v, given document d, is proportional to the number of times that query l results in a click on document d.

To avoid zero probabilities for queries that did not result in clicking on document d, smoothing can be performed to distribute the probabilities to such queries. Interpolation-based smoothing can be performed using the following equation:

$$\hat{P}(l \simeq v \mid d) = \lambda P(l \simeq v \mid d) + (1-\lambda) P(l \simeq v \mid CL) \qquad (2).$$

Here, $\lambda$ refers to a coefficient controlling the probability mass assigned to unclicked queries, and $P(l \simeq v \mid CL)$ refers to the background probability that l is clicked within an entire query log CL. The background probability can be calculated as:

$$P(l \simeq v \mid CL) = \frac{f_l}{\sum_{q \in CL} f_q}. \qquad (3)$$

Here, $f_q$ refers to a number of times query q is asked in click log CL. $f_l$ refers to the number of times query l is asked in click log CL.

The probability of query l being a synonym for value v over the observed document collection $D_v$ is the joint probability of the probabilities over the documents in $D_v$. The joint probability can be calculated by:

$$P(l \simeq v \mid D_v) = \prod_{d \in D_v} \hat{P}(l \simeq v \mid d). \qquad (4)$$

Applying the log function over the two sides of equation (4) results in the log likelihood:

$$\log P(l \simeq v \mid D_v) = \sum_{d \in D_v} \log \hat{P}(l \simeq v \mid d). \qquad (5)$$

This log likelihood can be used as the empirical log likelihood that l is a synonym for value v, that is:

$$\log P(l=v) \approx \log P(l=v \mid D_v) \qquad (6).$$

Another type of metric factor that the SGM 102 can obtain corresponds to an indication of a total number of times that a particular synonym candidate has been used to access any one of the k page items.

Another type of metric factor corresponds to an indication of how many of the k page items are associated with a particular synonym candidate.

Another type of metric factor corresponds to a total number of times that a particular synonym candidate has been used to access any page item (that is, not just the k page items).

Another type of metric factor corresponds to a total number of times that users were given an opportunity to click on one or the k page items upon submitting a particular query (regardless of whether the users actually clicked on one of the k page items). In the context of a typical search module, this type of impression-related metric factor can identify how many times one of the k page items appeared in the search results in response to entering a particular synonym candidate as a search term.

Still other types of metric factors can be obtained.

In block 904, the SGM 102 ranks the synonym candidates based on one or more of the metric factors identified above (or some other type of metric factor or combination thereof). The SGM 102 can apply various environment-specific techniques to rank the synonym candidates. In one technique, the SGM 102 can rely on a single metric factor to rank the synonym candidates, such as log likelihood. In this case, the SGM 102 can rank the synonym candidates from most appropriate to least appropriate based on the log likelihood values associated with the synonym candidates.

In other cases, the SGM 102 can rely on a combination of two or more metric factors to rank the synonym candidates based on any type of function or consideration, including any type of linear function, any type of non-linear function, and so on. For example, in one case, the SGM 102 can assign a score to each synonym candidate that is based on a weighted linear combination of two or more metric factors.

In any of the cases described above, the SGM 102 can rely on different considerations to select and configure the ranking function applied to rank the synonym candidates. In one case, the SGM 102 can rely on a user to manually examine the metric factors associated with a list of synonym candidates and select a ranking function that is deemed suitable to rank the synonym candidates. For example, the user may examine the metric factors to determine that the log likelihood is a suitable metric factor for use in ranking the synonym candidates.

In another case, the SGM 102 can apply an automated or semi-automated procedure to identify a suitable ranking function for use in ranking the synonym candidates. For example, in a separate learning procedure, a user can examine a training set of synonyms and associated metric factors. Based on this analysis, the user can label the synonyms in this training set to reflect whether they are appropriate or inappropriate variants of the canonical forms of the associated information items (such as movie titles). Or the user can assign variable scores (e.g., from 0 to 1) to the synonyms depending their assessed levels of appropriateness. Based on the labels applied by the user, the SGM 102 can then perform a training operation which automatically identifies the metric factors which are capable of discriminating suitable synonym candidates from unsuitable synonym candidates. Based on this analysis, the SGM 102 can select the metric factor (or metric factors) to be used to rank synonym candidates. Alternatively, or in addition, if it is deemed appropriate to use a multi-metric function to rank the synonym candidates, the SGM 102 can use the above-described learning procedure to calculate the weights to be applied to the individual metric factors within the function.

In any case, the SGM 102 can apply different considerations (and different functions) to rank synonym candidates associated with different sets of related items. For example, the SGM 102 may determine that a first type of function is appropriate to rank synonym candidates associated with movie titles, while a second type of function is appropriate to rank synonym candidates associated with actors, and so on. Further, the SGM 102 may determine that the appropriateness of a ranking function may change over time.

In block 906, the SGM 102 applies a threshold (or thresholds) to each set of ranked synonym candidates associated with an information item. The SGM 102 selects the synonym candidates above such a threshold as the final set of synonyms to be used in the synonym-expanded output data, discarding the remainder. Again, the SGM 102 can use various techniques to determine the threshold to be used. In one case, the SGM 102 can rely on a human user to examine the ranked list of synonym candidates and select an appropriate threshold. For example, the user can assign a threshold that corresponds to a point at which the metric factor values appear to markedly drop (if such a dramatic drop-off point in fact exists).

In another case, the SGM 102 can apply the type of automated or semi-automated learning procedure described above to identify appropriate thresholds. For example, the user can manually label a training set of synonyms to indicate their respective appropriateness. The SGM 102 can then apply a training procedure to automatically determine a threshold value that can be used to demarcate appropriate synonyms from inappropriate synonyms.

In general, block 908 of FIG. 9 identifies any type of manual analysis and/or automated learning analysis that can be used to define and configure the analysis tools used in block 904 and/or block 906, as described above.

Figure 10:
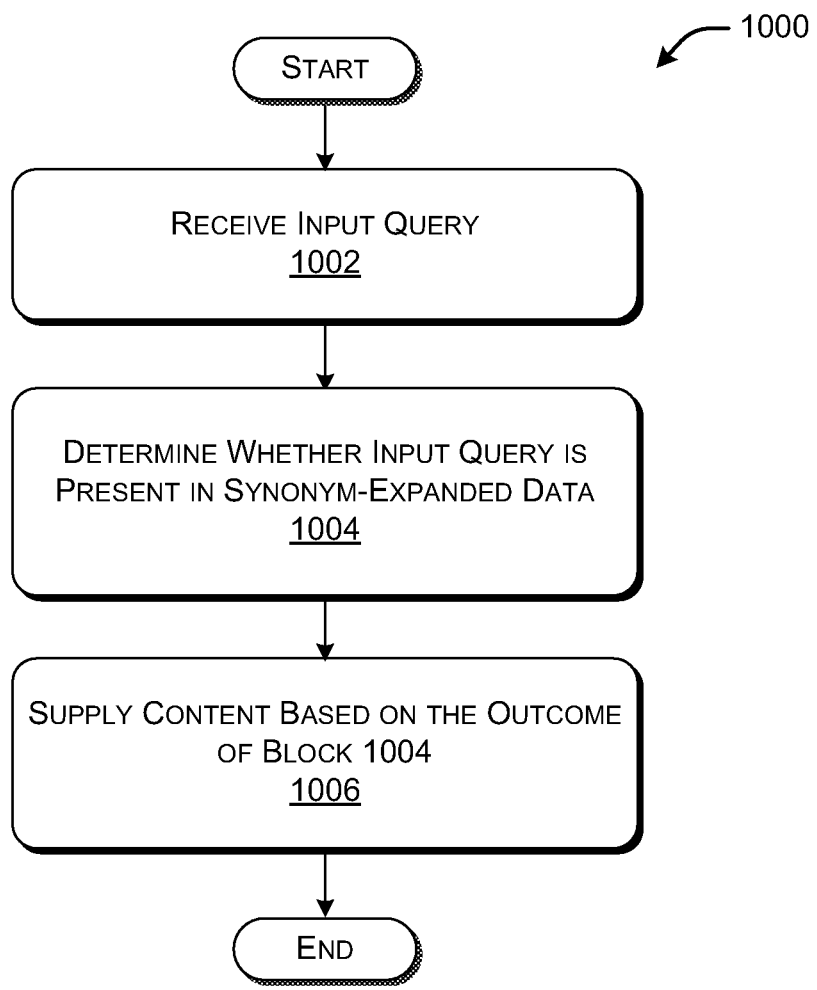
FIG. 10 is an illustrative procedure that describes how an output of the procedure of FIG. 6 can be used to facilitate a user's attempt to access network-accessible content.

FIG. 10 is an illustrative procedure 1000 which explains how the synonym-expanded output data can be used to facilitate a user's search for network-accessible content.

In block 1002, a search module (such as search module 402 in FIG. 4) receives an input query from a user. The input query may or may not match a canonical form of an information item maintained by the search module 402.

In block 1004, the search module 402 determines whether the input query matches any information item in the synonym-expanded data. The search module 402 can identify a match if the input query matches a canonical form of an information item or a synonym counterpart of the canonical form.

In bock 1006, if there is a match, the search module 402 can supply information regarding the matching entry to the user. The user can use this information to retrieve the desired network-accessible content (e.g., a Web page or the like).

C. Representative Processing Functionality

FIG. 11 sets forth illustrative electrical data processing functionality 1100 (simply "processing functionality" below) that can be used to implement any aspect of the functions described above. With reference to FIG. 1, for instance, the type of processing functionality 1100 shown in FIG. 11 can be used to implement any aspect of the synonym-generating module (SGM) 102. In one case, the processing functionality 1100 may correspond to any type of computing device.

The processing functionality 1100 can include volatile and non-volatile memory, such as RAM 1102 and ROM 1104, as well as one or more processing devices 1106. The processing functionality 1100 also optionally includes various media devices 1108, such as a hard disk module, an optical disk module, and so forth. The processing functionality 1100 can perform various operations identified above when the processing device(s) 1106 executes instructions that are maintained by memory (e.g., RAM 1102, ROM 1104, or elsewhere). More generally, instructions and other information can be stored on any computer-readable medium 1110, including, but not limited to, static memory storage devices, magnetic storage devices, optical storage devices, and so on. The term "computer-readable medium also encompasses plural storage devices. The term computer-readable medium also encompasses signals transmitted from a first location to a second location, e.g., via wire, cable, wireless transmission, etc.

The processing functionality 1100 also includes an input/output module 1112 for receiving various inputs from a user (via input modules 1114), and for providing various outputs to the user (via output modules). One particular output mechanism may include a presentation module 1116 and an associated graphical user interface (GUI) 1118. The processing functionality 1100 can also include one or more network interfaces 1120 for exchanging data with other devices via one or more communication conduits 1122. One or more communication buses 1124 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by at least one computing device, the method comprising:
    receiving an input information item;
    identifying a set of page items that are returned when the input information item is used in a first query to at least one search module;
    identifying one or more second queries, other than the first query, that have also been submitted to the at least one search module by users that accessed individual page items from the set of page items, wherein the one or more second queries are identified using query log data reflecting associations between the one or more second queries and the individual page items accessed by the users;
    providing a set of initial synonym candidates that were previously submitted to the at least one search module in the one or more second queries by the users that accessed the individual page items from the set of page items;
    removing noise from the set of initial synonym candidates, when the noise is present and can be identified, to obtain a set of filtered synonym candidates;
    reducing the set of filtered synonym candidates to a set of selected synonyms that are deemed appropriate proxies for the input information item by:
        obtaining metric factor values associated with the set of filtered synonym candidates, and
        applying a threshold to the metric factor values to select the set of selected synonyms from the set of filtered synonym candidates; and
    outputting synonym-expanded data that is formed based on the reducing.

2. The method of claim 1, wherein the method is performed with respect to each of a set of input information items, and wherein the set of input information items comprises a list of canonical information items associated with a common theme.

3. The method of claim 1, wherein the method is performed with respect to each of a set of input information items, wherein the set of input information items comprises at least part of a collection of data, the collection of data being at least partially structured.

4. The method of claim 1, wherein the identifying the set of page items comprises:
    submitting the input information item to the at least one search module as the first query;
    receiving, from the at least one search module, a set of initial page items in response to submitting the input information item; and
    selecting the set of page items from the set of initial page items.

5. The method of claim 1, wherein the method is performed with respect to each of a set of input information items, and wherein the removing the noise comprises:
    identifying, for each particular input information item of the set of input information items, at least one context-sensitive noise component within a corresponding set of initial synonym candidates associated with the particular input information item, when the at least one context-sensitive noise component is present and can be identified, the identifying of the at least one context-sensitive noise component being based on a determination that (a) the at least one context-sensitive noise component affects synonym candidates associated with two or more input information items in the set of input information items, and (b) the at least one context-sensitive noise component does not also affect canonical forms of the input information items; and
    removing the at least one context-sensitive noise component from the corresponding set of initial synonym candidates associated with the particular input information item.

6. The method of claim 1, wherein the reducing comprises:
    calculating the metric factor values associated with the set of filtered synonym candidates;
    ranking the set of filtered synonym candidates based on the metric factor values to provide a set of ranked synonym candidates; and
    applying the threshold such that each selected synonym of the set of selected synonyms is ranked above the threshold.

7. The method of claim 1, wherein the removing noise is performed after identifying the one or more second queries.

8. The method of claim 1, wherein the method is performed with respect to each of a set of input information items, and wherein the synonym-expanded data comprises the set of input information items in canonical form, supplemented to include, for each input information item of the set, an associated set of selected synonyms.

9. A computing device comprising:
    at least one storage device storing instructions of a synonym-generating module; and
    at least one processing device configured to execute the instructions,
    wherein the instructions of the synonym generating module comprise:
        an input module configured to receive an input information item;
        an expansion module configured to expand the input information item into a set of initial synonym candidates based on query log data, the query log data reflecting associations between prior queries submitted by users and page items accessed by the users in response to the prior submitted queries, the set of initial synonym candidates corresponding to the prior submitted queries in the query log data;
        a clean-up module configured to remove identifiable noise from the set of initial synonym candidates, wherein an output of the expansion module and the clean-up module comprises a set of filtered synonym candidates;
        a reduction module configured to select a set of synonyms from the set of filtered synonym candidates based on the query log data to provide a set of selected synonyms that are deemed appropriate proxies for the input information item; and
        an output module configured to output synonym-expanded data that is formed based on the set of synonyms selected by the reduction module,
    wherein the reduction module comprises:
        logic configured to obtain, based on the query log data, at least one metric factor associated with each filtered synonym candidate in the set of filtered synonym candidates to provide metric factors;
        logic configured to rank the set of filtered synonym candidates based on the metric factors to obtain a set of ranked synonym candidates; and logic configured to select the set of selected synonyms from the set of ranked synonym candidates based on the metric factors.

10. The computing device of claim 9, wherein the logic configured to select the set of selected synonyms comprises logic configured to apply a threshold to the set of ranked synonym candidates to identify the set of selected synonyms.

11. The computing device of claim 9, wherein the synonym-generating module operates on each of a set of input information items, and wherein the synonym-expanded data comprises the set of input information items in canonical form, supplemented to include, for each input information item, an associated set of selected synonyms.

12. A method performed by at least one computing device, the method comprising:
receiving an input information item;
identifying a set of page items that are returned as first search results when the input information item is used in a first query to at least one search module;
identifying one or more second queries, other than the first query, that have also been submitted to the at least one search module by users that accessed individual page items from the set of page items when the individual page items were returned as second search results for the one or more second queries, wherein the one or more second queries are identified using query log data reflecting that the one or more second queries were used by the users to access the individual page items;
providing a set of synonym candidates that were submitted to the at least one search engine in the one or more second queries by the users that accessed the individual page items from the set of page items;
identifying, from the set of synonym candidates, a set of selected synonyms that are deemed appropriate proxies for the input information item, wherein the set of selected synonyms are identified by:
obtaining metric factor values associated with the set of synonym candidates, and
at least one of applying a threshold to the metric factor values or ranking the synonym candidates according to the metric factor values; and
outputting the set of selected synonyms.

13. The method of claim 12, wherein the identifying the set of selected synonyms comprises filtering noise from the set of synonym candidates.

14. The method of claim 12, wherein the identifying the set of page items comprises submitting the first query to the at least one search module.

15. The method of claim 12, wherein the identifying the set of page items comprises identifying the set of page items using the query log data and the query log data indicates that the first query was previously submitted to the at least one search module.

16. The method of claim 12, wherein the set of selected synonyms are output to an individual user.

17. The method of claim 12, further comprising:
ranking the set of synonym candidates using the metric factor values; and
applying the threshold to the ranked set of synonym candidates to cull some of the set of synonym candidates that are not included in the set of selected synonyms.

18. The method of claim 12, further comprising:
deriving an individual metric factor value for an individual initial synonym candidate by determining a number of times that an individual page item was accessed by the users when the individual page item was returned as an individual second search result in response to an individual second query that includes the individual initial synonym candidate.

19. The method of claim 12, further comprising:
deriving an individual metric factor value for an individual initial synonym candidate by determining a number of times that an individual page item was clicked by the users when the individual page item was returned as an individual second search result in response to an individual second query that includes the individual initial synonym candidate.

20. The method of claim 12, wherein the metric factor values are obtained for at least two different metric factors for each of the synonym candidates.

* * * * *